(12) United States Patent
Abedini et al.

(10) Patent No.: US 10,772,061 B2
(45) Date of Patent: Sep. 8, 2020

(54) HANDLING OVERLAPPED COMMUNICATIONS

(71) Applicant: QUALCOMM Incorporated, San Diego, CA (US)

(72) Inventors: Navid Abedini, Somerset, NJ (US); Bilal Sadiq, Basking Ridge, NJ (US); Muhammad Nazmul Islam, Edison, NJ (US); Sundar Subramanian, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/191,677

(22) Filed: Nov. 15, 2018

(65) Prior Publication Data

US 2019/0159155 A1    May 23, 2019

Related U.S. Application Data

(60) Provisional application No. 62/587,920, filed on Nov. 17, 2017.

(51) Int. Cl.
*H04W 56/00*    (2009.01)
*H04J 3/06*    (2006.01)
*H04W 72/04*    (2009.01)

(52) U.S. Cl.
CPC ....... *H04W 56/0045* (2013.01); *H04J 3/0605* (2013.01); *H04W 56/004* (2013.01);
(Continued)

(58) Field of Classification Search
CPC .......... H04W 56/0045; H04W 56/004; H04W 72/0446; H04W 72/0406; H04W 56/0065;
(Continued)

(56) References Cited

U.S. PATENT DOCUMENTS

| 8,958,412 B2* | 2/2015 | Singh .................... H04B 7/0695 |
| | | 370/350 |
| 2012/0113905 A1 | 5/2012 | Anderson et al. |

(Continued)

OTHER PUBLICATIONS

International Search Report and Written Opinion—PCT/US2018/061445—ISA/EPO—dated Feb. 14, 2019.
(Continued)

*Primary Examiner* — Sharad Rampuria
(74) *Attorney, Agent, or Firm* — Holland & Hart LLP

(57) ABSTRACT

Methods, systems, and devices for wireless communications are described. The described techniques provide for determining to not transmit a portion of a second signal that overlaps in time with a first signal. A user equipment (UE) may identify a first signal to be communicated during a first time duration using a first beam pair link (BPL) and identify a second signal that is scheduled to be communicated during a second time duration using a second BPL. The UE may identify a misalignment between timing advance values for the BPLs, the misalignment causing an overlap in time between the first signal scheduled during the first time duration and the second signal scheduled during the second time duration. The UE may determine whether to drop part of the second signal and communicate the first signal and a remaining portion of the second signal based at least in part on the determining.

29 Claims, 19 Drawing Sheets

(52) U.S. Cl.
CPC ... *H04W 56/0065* (2013.01); *H04W 72/0406* (2013.01); *H04W 72/0446* (2013.01)

(58) Field of Classification Search
CPC . H04W 72/1268; H04W 72/04; H04W 72/12; H04W 76/00; H04J 3/0605; H04J 2203/0069; H04B 7/2121; H04B 7/2123; H04Q 2213/394
See application file for complete search history.

(56) References Cited

U.S. PATENT DOCUMENTS

| | | | |
|---|---|---|---|
| 2014/0293968 | A1 | 10/2014 | Ebrahimi et al. |
| 2017/0070960 | A1* | 3/2017 | Haim .................. H04W 52/243 |
| 2017/0332332 | A1 | 11/2017 | Zhang et al. |
| 2019/0357300 | A1* | 11/2019 | Zhou ................. H04W 72/0446 |

OTHER PUBLICATIONS

LG Electronics: "Multiple UL Timing Control," 3GPP Draft; R1-121451 Multiple UL Timing Control, 3rd Generation Partnership Project (3GPP), Mobile Competence Centre; 650, Route Des Lucioles; F-06921 Sophia-Antipolis Cedex; France, vol. RAN WG1, No. Jeju, Korea; Mar. 26, 2012-Mar. 30, 2012, Mar. 20, 2012, XP050599734, 3 pages, [retrieved on Mar. 20, 2012].

* cited by examiner

HANDLING OVERLAPPED COMMUNICATIONS

CROSS REFERENCES

The present Application for Patent claims the benefit of U.S. Provisional Patent Application No. 62/587,920 by ABEDINI, et al., entitled "HANDLING OVERLAPPED UPLINK TRANSMISSIONS," filed Nov. 17, 2017, assigned to the assignee hereof, and expressly incorporated herein.

BACKGROUND

The following relates generally to wireless communications, and more specifically to handling overlapped uplink transmissions.

Wireless communications systems are widely deployed to provide various types of communication content such as voice, video, packet data, messaging, broadcast, and so on. These systems may be capable of supporting communications with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. A wireless multiple-access communications system may include a number of base stations or network access nodes, each simultaneously supporting communications for multiple communication devices, which may be otherwise known as user equipments (UEs).

In some examples of a wireless communications system, a base station and a UE may communicate, for example using uplink (UL) transmissions from the UE to the base station, or downlink (DL) transmissions from the base station to the UE. An uplink transmission, for example, may have some delay between transmission at the UE and reception at the base station. To ensure that reception of various communications at the base station are aligned (compensating for the delay such that transmissions may be aligned), the base station may apply a timing advance (TA) to scheduled transmissions, and may indicate a TA value to various UEs within a geographic coverage area via a TA command. In some cases, UEs within a wireless communications system may be highly mobile, and a TA value corresponding to different devices may become inaccurate as UEs change positions and/or operations. Furthermore, in some examples of a wireless communications system (e.g., a 5G system), wireless nodes within a system may communicate via highly directional beams. For example, a base station and a UE may communicate via beam pair links (BPLs), each BPL including a transmit beam of one wireless node (e.g., a UE) and a receive beam of a second wireless node (e.g., a base station). In some examples, a UE may multiplex various uplink transmissions on more than one BPL. BPLs may be highly directional, and uplink BPLs and downlink BPLs for the same UE may be the same or different. In such a configuration, different BPLs may have different round trip times (RTTs) due to non-reciprocity, or may have different RTTs due to mobility of the UE. Thus, various signals multiplexed by the UE may have different transmissions timings. A first signal and a second signal may overlap, due to the timing misalignment, which may result in collisions and interference at the base station, decreasing performance of the wireless communications system.

SUMMARY

The described techniques relate to improved methods, systems, devices, or apparatuses that support handling overlapping uplink transmissions. Generally, the described techniques provide for improved methods, systems, devices, or apparatuses that support the handling of overlapping uplink transmissions. Generally, the described techniques provide for determining to drop (e.g., refrain from transmitting) the whole or part of a second signal that overlaps with a first signal. In some cases, a user equipment (UE) may identify that a first signal and a second signal scheduled to be transmitted in adjacent time durations may overlap in time due to a misalignment between the timing advances of the two signals. The adjacent durations may be adjacent symbol periods, slots, non-slot durations such as a certain number of symbol periods (e.g., 2, 4, or 7 symbol periods), or a subframe duration. The UE may decide to drop a portion of the second signal. The decision to drop a portion of the second signal may be based on an amount of overlap (for example, the amount of overlap exceeding a threshold amount), a communication parameter, communication configurations for transmission of the first signal and second signal, or conflict resolution rules. The UE may then transmit the first signal and a remaining portion of the second signal.

In some cases, a UE may identify the overlap, and schedule the first signal and the second signal to eliminate at least a portion of the overlap in time. In other cases, a base station may identify that an overlap will occur, and schedule the first signal and the second signal to be transmitted by the UE to eliminate at least a portion of the overlap in time. The overlap in time may be eliminated, reduced, or a reduced portion of the signal may be dropped.

A method of wireless communication is described. The method may include identifying a first signal that is scheduled to be communicated at the first wireless node during a first time duration using a first beam pair link (BPL), identifying a second signal that is scheduled to be communicated at the first wireless node during a second time duration using a second BPL, the second time duration adjacent to the first time duration, identifying a misalignment between a first timing advance value for the first BPL and a second timing advance value for the second BPL, the misalignment causing an overlap in time between the first signal scheduled during the first time duration and the second signal scheduled during the second time duration, determining whether to drop a portion of the second signal, and transmitting the first signal and a remaining portion of the second signal based at least in part on the determining.

An apparatus for wireless communication is described. The apparatus may include means for identifying a first signal that is scheduled to be communicated at the first wireless node during a first time duration using a first BPL, means for identifying a second signal that is scheduled to be communicated at the first wireless node during a second time duration using a second BPL, the second time duration adjacent to the first time duration, means for identifying a misalignment between a first timing advance value for the first BPL and a second timing advance value for the second BPL, the misalignment causing an overlap in time between the first signal scheduled during the first time duration and the second signal scheduled during the second time duration, means for determining whether to drop a portion of the second signal, and means for transmitting the first signal and a remaining portion of the second signal based at least in part on the determining.

Another apparatus for wireless communication is described. The apparatus may include a processor, memory in electronic communication with the processor, and instructions stored in the memory. The instructions may be operable to cause the processor to identify a first signal that is scheduled to be communicated at the first wireless node during a first time duration using a first BPL, identify a second signal that is scheduled to be communicated at the first wireless node during a second time duration using a second BPL, the second time duration adjacent to the first time duration, identify a misalignment between a first timing advance value for the first BPL and a second timing advance value for the second BPL, the misalignment causing an overlap in time between the first signal scheduled during the first time duration and the second signal scheduled during the second time duration, determine whether to drop a portion of the second signal, and transmit the first signal and a remaining portion of the second signal based at least in part on the determining.

A non-transitory computer-readable medium for wireless communication is described. The non-transitory computer-readable medium may include instructions operable to cause a processor to identify a first signal that is scheduled to be communicated at the first wireless node during a first time duration using a first BPL, identify a second signal that is scheduled to be communicated at the first wireless node during a second time duration using a second BPL, the second time duration adjacent to the first time duration, identify a misalignment between a first timing advance value for the first BPL and a second timing advance value for the second BPL, the misalignment causing an overlap in time between the first signal scheduled during the first time duration and the second signal scheduled during the second time duration, determine whether to drop a portion of the second signal, and transmit the first signal and a remaining portion of the second signal based at least in part on the determining.

In some examples of the method, apparatus, and non-transitory computer-readable medium described above, the first time duration and the second time duration comprise a symbol period, or a slot duration, or a non-slot duration, or a subframe duration, or a combination thereof.

In some examples of the method, apparatus, and non-transitory computer-readable medium described above, the first wireless node determines to drop the portion of the second signal scheduled during the identified overlap in time.

In some examples of the method, apparatus, and non-transitory computer-readable medium described above, determining whether to drop the portion of the second signal comprises identifying that the overlap in time exceeds a threshold value. Some examples of the method, apparatus, and non-transitory computer-readable medium described above may further include processes, features, means, or instructions for determining to drop the portion of the second signal based at least in part on identifying that the overlap in time exceeds the threshold value.

In some examples of the method, apparatus, and non-transitory computer-readable medium described above, determining whether to drop the portion of the second signal comprises: identifying that the identified overlap in time does not exceed a threshold value. Some examples of the method, apparatus, and non-transitory computer-readable medium described above may further include processes, features, means, or instructions for determining to transmit both the first signal and the second signal based at least in part on identifying that the overlap in time does not exceed the threshold value.

Some examples of the method, apparatus, and non-transitory computer-readable medium described above may further include processes, features, means, or instructions for identifying a first value for a communication parameter for the first signal. Some examples of the method, apparatus, and non-transitory computer-readable medium described above may further include processes, features, means, or instructions for identifying a second value for the communication parameter for the second signal. Some examples of the method, apparatus, and non-transitory computer-readable medium described above may further include processes, features, means, or instructions for comparing the first value to the second value, wherein determining whether to drop the portion of the second signal may be based at least in part on the comparing.

In some examples of the method, apparatus, and non-transitory computer-readable medium described above, the communication parameter comprises a communication priority, or a type of communication, or a combination thereof.

In some examples of the method, apparatus, and non-transitory computer-readable medium described above, the type of communication comprises a physical random access channel (PRACH), or a physical uplink shared channel (PUSCH), or a physical uplink control channel (PUCCH), or a sounding reference signal (SRS), or a combination thereof.

Some examples of the method, apparatus, and non-transitory computer-readable medium described above may further include processes, features, means, or instructions for identifying a first communication configuration to be used for the first signal, and a second communication configuration to be used for the second signal, wherein determining whether to drop the portion of the second signal may be based at least in part on the first communication configuration and the second communication configuration.

In some examples of the method, apparatus, and non-transitory computer-readable medium described above, the communication configuration comprises an uplink transmission power, or a beamforming configuration, or a link budget, or a combination thereof.

Some examples of the method, apparatus, and non-transitory computer-readable medium described above may further include processes, features, means, or instructions for identifying one or more rules used to resolve communication conflicts, wherein determining whether to drop the portion of the second signal may be based at least in part on the one or more rules. Some examples of the method, apparatus, and non-transitory computer-readable medium described above may further include processes, features, means, or instructions for receiving the one or more rules from the second wireless node.

Some examples of the method, apparatus, and non-transitory computer-readable medium described above may further include processes, features, means, or instructions for receiving the one or more rules via a master information block (MIB), or a system information block (SIB), or a remaining minimum system information (RMSI), or an other system information (OSI), or a radio resource control (RRC) message, or a downlink control information (DCI), or a media access control (MAC) control element (CE), or a combination thereof.

In some examples of the method, apparatus, and non-transitory computer-readable medium described above, the first wireless node may be a UE and a second wireless node may be a base station. In some examples of the method, apparatus, and non-transitory computer-readable medium described above, the first wireless node may be a first base station, and a second wireless node may be a scheduling base station. In some examples of the method, apparatus, and non-transitory computer-readable medium described above, the first wireless node may be a first UE and a second wireless node may be a scheduling UE. In some examples of the method, apparatus, and non-transitory computer-readable medium described above, the second signal may be first in time, and the first signal may be second in time.

Some examples of the method, apparatus, and non-transitory computer-readable medium described above may further include processes, features, means, or instructions for identifying that the first timing advance value for the first BPL may be greater than the second timing advance value. Some examples of the method, apparatus, and non-transitory computer-readable medium described above may further include processes, features, means, or instructions for transmitting the first signal prior to the remaining portion of the second signal.

A method of wireless communication is described. The method may include identifying a first signal to be communicated at a second wireless node using a first BPL, identifying a second signal to be communicated at the second wireless node using a second BPL, identifying a misalignment between a first timing advance value for the first BPL and a second timing advance value for the second BPL, the misalignment to cause an overlap in time between the first signal and the second signal if the first signal is scheduled during a first time duration and the second signal is scheduled during a second time duration adjacent to the first time duration, and scheduling the first signal and the second signal to eliminate at least a portion of the overlap in time.

An apparatus for wireless communication is described. The apparatus may include means for identifying a first signal to be communicated at a second wireless node using a first BPL, means for identifying a second signal to be communicated at the second wireless node using a second BPL, means for identifying a misalignment between a first timing advance value for the first BPL and a second timing advance value for the second BPL, the misalignment to cause an overlap in time between the first signal and the second signal if the first signal is scheduled during a first time duration and the second signal is scheduled during a second time duration adjacent to the first time duration, and means for scheduling the first signal and the second signal to eliminate at least a portion of the overlap in time.

Another apparatus for wireless communication is described. The apparatus may include a processor, memory in electronic communication with the processor, and instructions stored in the memory. The instructions may be operable to cause the processor to identify a first signal to be communicated at a second wireless node using a first BPL, identify a second signal to be communicated at the second wireless node using a second BPL, identify a misalignment between a first timing advance value for the first BPL and a second timing advance value for the second BPL, the misalignment to cause an overlap in time between the first signal and the second signal if the first signal is scheduled during a first time duration and the second signal is scheduled during a second time duration adjacent to the first time duration, and schedule the first signal and the second signal to eliminate at least a portion of the overlap in time.

A non-transitory computer-readable medium for wireless communication is described. The non-transitory computer-readable medium may include instructions operable to cause a processor to identify a first signal to be communicated at a second wireless node using a first BPL, identify a second signal to be communicated at the second wireless node using a second BPL, identify a misalignment between a first timing advance value for the first BPL and a second timing advance value for the second BPL, the misalignment to cause an overlap in time between the first signal and the second signal if the first signal is scheduled during a first time duration and the second signal is scheduled during a second time duration adjacent to the first time duration, and schedule the first signal and the second signal to eliminate at least a portion of the overlap in time.

Some examples of the method, apparatus, and non-transitory computer-readable medium described above may further include processes, features, means, or instructions for transmitting an indication of the scheduling to the second wireless node.

In some examples of the method, apparatus, and non-transitory computer-readable medium described above, the first time duration and the second time duration comprise a symbol period, or a slot duration, or a non-slot duration, or a subframe duration, or a combination thereof. Some examples of the method, apparatus, and non-transitory computer-readable medium described above may further include processes, features, means, or instructions for transmitting, to the second wireless node, one or more rules used to resolve communication conflicts.

In some examples of the method, apparatus, and non-transitory computer-readable medium described above, transmitting the one or more rules comprises: transmitting the one or more rules via a MIB, or a system SIB, or a RMSI, or an OSI, or a radio RRC message, or a DCI, or a MAC CE, or a combination thereof.

In some examples of the method, apparatus, and non-transitory computer-readable medium described above, the first wireless node may be a base station and the second wireless node may be a UE. In some examples of the method, apparatus, and non-transitory computer-readable medium described above, the first wireless node may be a UE, and the second wireless node may be a UE. In some examples of the method, apparatus, and non-transitory computer-readable medium described above, the first wireless node and the second wireless node may be the same wireless node.

DETAILED DESCRIPTION

Figure 1:
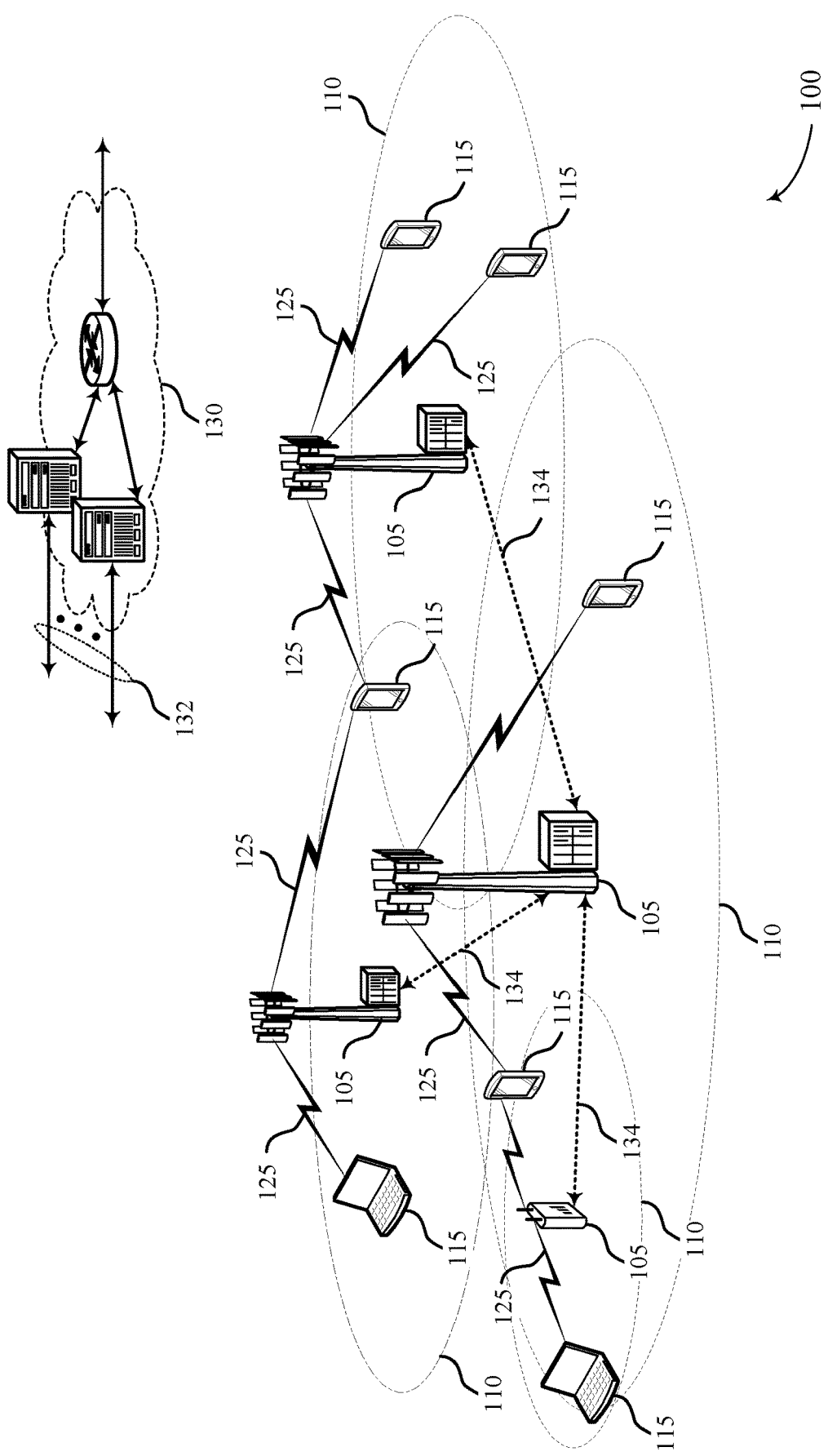
FIG. 1 illustrates an example of a system for wireless communication that supports handling overlapped uplink transmissions in accordance with aspects of the present disclosure.

In some examples of a wireless communications system, a user equipment (UE) and a base station may communicate via uplink or downlink transmissions. A transmission may be sent, for example, from a UE to a base station. There may be some delay between when the UE sends the transmission and when the base station receives the transmission. That delay may be accounted for by a timing advance (TA) value. That is, a TA value may be a time duration that is related to the time delay of a transmission, which may be dependent on one or more characteristics of the transmission path. The TA value may be applied to the scheduling of a transmission such that the transmission is sent earlier to account for the delay. Thus, transmissions for a first UE in a wireless communications system may have a first delay and the first UE may apply a first TA value, and transmissions for a second UE at a different location within the same wireless communications system may have a second delay and the second UE may apply a second TA value. The application of the first TA value and the second TA value to the first and second UEs may result in transmissions from the first UE and the second UE being aligned upon arrival at a base station. A base station may transmit a TA command, which may include a TA value, to a UE to indicate to the UE the TA value that the UE should use for uplink transmissions.

In some wireless communications systems, a base station may estimate a TA value based at least in part on a received random access channel (RACH) from a UE. The base station may transmit a TA command containing the TA value to the UE in a random access response (RAR). A base station may then regularly (e.g., in a connected mode operation) estimate uplink timing based on uplink transmissions from the UE, such as a physical uplink control channel (PUCCH), a physical uplink shared channel (PUSCH) or a sounding reference signal (SRS). When uplink timing becomes misaligned, a base station may transmit an updated TA command to a UE to correct (realign) uplink transmission timing in a media access control (MAC) control element (CE). A UE may receive the TA command, and may adjust its uplink transmission timing according to the TA value. However, there may be a delay in the timing adjustment between receiving the TA command and adjusting the transmission timing. Such a delay may have a long duration (e.g., six or more subframes).

In some cases, a wireless node (e.g., a UE) may communicate with another wireless node (e.g., a base station) via highly directional beam pair links (BPLs). Each BPL may include a transmit beam of one wireless node (e.g., a UE) and a receive beam of another wireless node (e.g., a base station). In some examples, a UE may communicate with a base station simultaneously on more than one BPL. Furthermore, different BPLs may have different round trip times (RTTs). For example, an uplink BPL and downlink BPL for the same UE may not have reciprocity. That is, the uplink BPL may not share the same physical path as the downlink BPL. For example, the uplink BPL may follow a first physical path, reflecting off of one or more surfaces, and the downlink BPL may follow a second, different physical path, reflecting off of one or more difference surfaces. The downlink BPL's physical path may be longer or shorter than the uplink BPL's physical path. Thus, a TA value for a first BPL may be different than a TA value for a second BPL. In such examples, a UE communicating with a base station via multiple BPLs with different RTTs may be scheduled with transmissions that are misaligned in time, which may be overlapping. In some cases, a timing misalignment between two different BPLs may result in an overlap in time between two or more scheduled uplink or downlink transmissions.

In some examples, a UE may communicate on various uplink and downlink BPLs. Although an uplink BPL may have reciprocity with a corresponding downlink BPL, the UE may be scheduled (e.g., autonomously or by a base station) to multiplex uplink transmissions across more than one uplink BPLs into a first time duration and a second time duration. For example, a first uplink BPL may have a first RTT, and a second uplink BPL may have a second RTT. When a UE is scheduled to transmit uplink transmissions on different BPLs, the scheduled uplink transmissions may overlap if one or more of the BPLs are misaligned due to a difference in RTT.

In some examples, a UE may be mobile or even highly mobile. Because the BPLs on which the UE communicates are highly directional, a RTT for a given BPL may change rapidly with time. Thus, a TA value for a BPL that previously successfully aligned uplink transmission from the UE may no longer successfully align the uplink transmission timing of a BPL within the time when the UE is mobile. Transmissions on such a BPL may be misaligned with respect to other transmissions on other BPLs. In such cases, a UE may make a determination on how to address an overlap between communicating two signals.

In some wireless communications systems, when a UE determines that two scheduled uplink transmissions overlap in time due to a misalignment, the UE may merely adopt a first-in-time rule. That is, the UE may drop (e.g., refrain from transmitting) the scheduled transmission that is second in time and send the transmission that is first in time. For example, in cases where two uplink transmissions are scheduled to overlap in time in a serving cell within the same timing alignment group (TAG), the UE may determine to transmit one of the transmissions and not transmit the second by applying a rule. The rule may dictate that a signal scheduled for transmission in subframe n is to be transmitted, and an overlapping signal scheduled for uplink transmission in subframe n+1 may be dropped. The transmissions may overlap because some or all of the signal to be transmitted in subframe n+1 may arrive at the base station during reception of some or all of the signal transmitted in subframe n. However, in some wireless communications systems (e.g., a 5G system), it may be possible for a UE to transmit at least a portion of an overlapping signal.

In some cases, considerations other than a first-in-time rule may result in a greater improvement in the performance of the wireless communications system. For example, a transmission scheduled second in time may be more valuable or more critical to various operations than a transmission scheduled first in time. In some situations, a UE or base station may not be able to transition between different transmission properties or conditions if there is insufficient time between the scheduled transmissions. For example, a UE may not have sufficient time to transition between a first transmission power and a second transmission power or to switch between using a first antenna array or using a second antenna array. In some cases, an overlap in time may be small enough that it is possible and worthwhile to transmit both overlapping signals, or so large as to make it more efficient to drop the entirety of one of the overlapping signals. In some examples, one or more rules may be utilized to determine which overlapping signal is to transmitted (in whole or in part).

Thus, a UE may identify which of two overlapping signals to transmit (i.e., instead of always selecting the first-in-time scheduled transmission), and may determine whether to transmit at least a portion of a second overlapping signal. In some examples, a UE may drop (e.g., refrain from transmitting) a part or all of at least one of the two or more overlapping signals. For example, a UE may drop the portion of a second signal that overlaps with a first signal, and transmit the first signal and the remaining portion of the second signal. Or, the UE may drop the entirety of the second overlapping signal, and may transmit only the first signal. The UE may, for example, transmit the second signal and drop the first signal.

The decision to drop the whole or part of at least one of the two overlapping signals may be based at least in part on a combination of the type of multiplexed signals, the amount of overlap or the time misalignment, or a communication configuration of the two transmissions. In one example, one type of multiplexed signal may be given priority over another when deciding whether to drop parts of one signal or another signal. For example, a UE or base station may decide to drop a low-priority scheduling request (SR) transmission when it interferes with an acknowledgement (ACK) or negative ACK (NACK) transmission. In another example, the UE or base station may decide to drop a whole second signal after transmitting a first signal if the overlapping portion of the second signal is greater than a threshold amount of overlap. The communication configuration of the two transmissions may relate to the power levels of the transmissions, beamforming configurations, or required link budgets.

For example, one of two overlapping signals may have a higher priority or be more critical than the other. In such examples, the UE may determine to drop all or a portion of the lower priority or less critical of the two overlapping signals. In some examples, a UE may not have sufficient time to transition between a first transmission power and a second transmission power if two signals overlap too much in time. But, if an overlap in time is small, then the UE may have sufficient time to make the transition and transmit at least a portion of the second signal. In such examples, the UE may determine whether to drop at least a portion of one of the overlapping signals based on the difference in transmission powers. In some cases, a communication configuration may affect how a UE determines whether to drop a portion of one of two overlapping signals. For instance, a UE may not have sufficient time to transition between a first antenna array or a second antenna array if two signals overlap too much in time. But, if an overlap in time is small, then the UE may have sufficient time to make the transition and transmit at least a portion of the second signal. Or, if two overlapping transmissions are transmitted with the same antenna array, then the UE may determine to transmit all of one overlapping signal and at least a non-overlapping portion of another overlapping signal. In some cases, if two overlapping transmissions use a low modulation and coding scheme (MCS), then a small overlap may not be detrimental to successful transmissions. Alternatively, if one overlapping signal has a higher MCS and another overlapping signal has a lower MCS, then the UE may determine to transmit the higher MCS signal, and only transmit a portion of the lower MCS signal. In some cases, an overlap in time may be small enough to transmit both overlapping signals, or so large as to make it more efficient to drop the entirety of one of the overlapping signals.

Thus, parameters such as transmission type, communication configuration, link budget, and amount of overlap may be utilized by the UE and base station in determining whether to drop at least a portion of one of two overlapping signals.

The UE may decide to drop the whole or part of at least one of two overlapping signals based on a received indication. For example, a base station may indicate to the UE whether to drop the whole or part of at least one of two overlapping signals. In some examples, the base station may indicate which of the two overlapping transmissions to drop in one or more of a master information block (MIB), a system information block (SIB), a remaining minimum system information (RMSI), an other system information (OSI), a radio resource control (RRC) message, through downlink control information (DCI), via a MAC CE, or through other upper layer signaling.

In some examples, a base station may determine that two uplink signals are scheduled to overlap because of an uplink timing misalignment. For example, a base station may identify a first scheduled uplink signal and a second scheduled uplink signal. The base station may identify a first TA value corresponding to the first scheduled uplink signal on a first BPL, and a second TA value corresponding to the second scheduled uplink signal on a second BPL. Based on the differing TA values, the base station may identify a timing misalignment between the two scheduled uplink signals, the misalignment resulting in an overlap in time of the two uplink signals. However, all or a portion of one of the overlapping signals may be dropped by the UE due to the overlap in time.

To avoid dropping all or a portion of one of the overlapping scheduled uplink signals, the base station may schedule multiple uplink transmissions in a way to reduce or avoid overlap between the transmissions. In some cases, the base station may identify the overlap based on previously received uplink transmissions. For example, the base station may receive one or more misaligned uplink data transmissions, or uplink measurement reports from a UE, and may identify a misalignment based on the received signals. In such examples, the overlap in time may be eliminated or reduced, or a smaller portion of the signal may be dropped.

In some examples, a UE may have the flexibility to schedule its own transmissions. In such cases, the UE may receive an uplink grant from the base station, and may identify a misalignment between a scheduled signal on a first BPL and a scheduled signal on a second BPL. In such examples, the UE may adjust its own scheduled uplink transmissions to avoid the overlap. In such examples, the overlap in time may be eliminated, reduced, or a reduced portion of the signal may be dropped.

The above described techniques may improve throughput, for example, by mitigating collisions. The techniques described herein may also increase the overall system performance of the wireless communications system.

Aspects of the disclosure are initially described in the context of a wireless communications system, overlapping transmission schemes, and process flows. Aspects of the disclosure are further illustrated by and described with reference to apparatus diagrams, system diagrams, and flowcharts that relate to handling overlapped uplink transmissions.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A MAC layer may perform priority handling and multiplexing of logical channels into transport channels. The MAC layer may also use hybrid automatic repeat request (HARD) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an frequency division duplexing (FDD) mode), or be configured to carry downlink and uplink communications (e.g., in a time division duplexing (TDD)

mode). In some examples, signal waveforms transmitted over a carrier may be made up of multiple subcarriers (e.g., using multi-carrier modulation (MCM) techniques such as orthogonal frequency division multiplexing (OFDM) or DFT-s-OFDM).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some instances, a UE 115 may drop (e.g., refrain from transmitting) a portion of a second signal that overlaps in time with a first signal. The UE 115 may identify that a first signal and a second signal overlap in time due to a misalignment between the timing advances of the two signals. The UE 115 may determine to drop a portion of one of the signals to avoid collisions or interference. The decision to drop a portion of an overlapping signal may be based at least in part on an amount of overlap, a communication parameter, a communication configuration, or conflict resolution rules. The UE 115 may then transmit the first signal and a remaining portion of the second signal. In some examples, a UE 115 that has the flexibility to schedule its own uplink transmissions may schedule or reschedule uplink transmissions to reduce or entirely avoid an overlap in time between two signals. In some examples, a base station 105 may infer or identify an overlap between subsequently scheduled signals, and may schedule or reschedule the overlapping signals to eliminate or avoid at least a portion of the overlap in time. In some examples, a base station 105 performs some or all of the techniques described herein with respect to the UE 115.

Figure 2A:
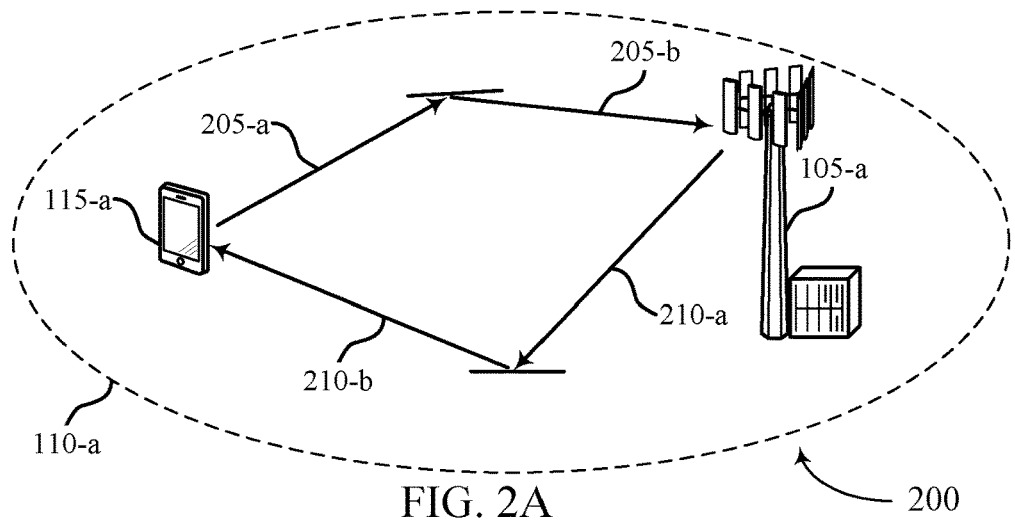
FIGS. 2A through 2C illustrate examples of a wireless communications system that supports handling overlapped uplink transmissions in accordance with aspects of the present disclosure.

FIG. 2A illustrates an example of a wireless communications system 200 that supports handling overlapped uplink transmissions in accordance with various aspects of the present disclosure. In some examples, the wireless communications system 200 may implement aspects of wireless communications system 100. The wireless communications system 200 may include a first wireless node, and a second wireless node. In some examples, the first wireless node may be a base station 105-a, and a second wireless node may be a UE 115-a, which may be examples of the corresponding devices described with reference to FIG. 1. In some cases, a second node may be a base station 105, where the base station 105-a is a scheduling base station. In some examples, a first wireless node may be a base station 105 or relay that schedules a second base station 105 or relay in a backhaul network or integrated access backhaul network (IAB). In some examples, a first wireless node may be a scheduling UE 115, and the second and third wireless nodes may be non-scheduling UEs 115. For example, a first wireless node that is a UE 115 and a second wireless node that is a non-scheduling UE 115 may operate in a device to device (D2D) network or a UE to UE (UE2UE) network. In such examples, the second non-scheduling UE 115 may be scheduled by the first UE 115, or by a different wireless node, which may be a third UE 115 or a base station 105. For purpose of illustration only, the first wireless node may be referred to as base station 105-a, and the second wireless node may be referred to as UE 115-a. But, it should be understood that these are by way of example only, and that base station 105-a, UE 115-a, and UE 115-b could be examples of various wireless nodes as noted above and could be in communication with additional wireless nodes. In other examples, either or both of the wireless nodes may be may be a UE 115 or a base station 105.

In some examples, a base station 105-a may communicate with one or more UEs 115 that are located within a geographic coverage area 110-a. Base station 105-a may communicate with UEs 115 via highly directional BPLs. Each BPL may include a transmit beam (e.g., of uplink BPL 205-a and downlink BPL 210-a) and a receive beam (e.g., receive beam of uplink BPL 205-b, and receive beam of downlink BPL 210-b). For example, UE 115-a may communicate with base station 105-a via uplink BPL 205 and downlink BPL 210. In some examples, uplink BPL 205 and downlink BPL 210 may not be reciprocal BPLs, and therefore may not have the same physical path or the same RTT as each other.

Because uplink BPL 205 and downlink BPL 210 may not have the same RTT, propagation delay and transmission or reception delays may not be the same for each BPL. This may result in collisions or interference of communications between UE 115-a and base station 105-a. Furthermore, if all transmission timings corresponding to all BPLs of UE 115-a are realigned using the same TA value, in some cases one or more BPLs may still be misaligned due to the different RTTs of each BPL.

Figure 2B:
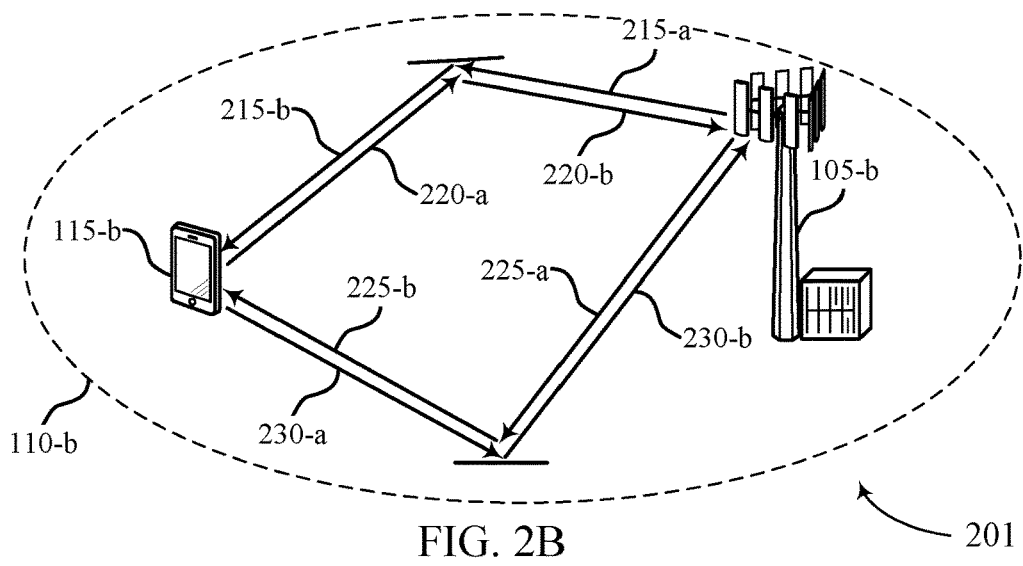

FIG. 2B illustrates another example of a wireless communications system 201 that supports handling overlapped uplink transmissions in accordance with various aspects of the present disclosure. In some examples, wireless communications system 201 may implement aspects of wireless communications systems 100 and 200. Wireless communications system 201 may include a first wireless node, and a second wireless node. By way of example, a first wireless node may be base station 105-b, and a second wireless node may be UE 115-b. In other examples, either or both of the wireless nodes may be may be a UE 115 or a base station 105.

In some examples, base station 105-a may communicate with UEs 115 via highly directional beam pair links (BPLs). In some examples, UE 115-b may communicate with base station 105-a simultaneously on more than one BPL, such as BPLs 215, 220, 225, and 230. In some cases, each BPL may have different RTTs. For example, UE 115-b may be highly mobile, resulting in different RTTs for each BPL. In other examples, UE 115-b may send uplink transmissions via uplink BPL 220 and via uplink BPL 230. For instance, UE 115-b may multiplex various uplink transmissions across both uplink BPL 220 and uplink BPL 230. BPL 220 and BPL 230 may utilize different physical paths, may be reflected off of various surfaces, and therefore may have different RTTs. In such cases, uplink transmissions may suffer from collisions and interference due to timing misalignments. Furthermore, if all transmission timings corresponding to all BPLs of UE 115-b are realigned using the same TA value, in some cases one or more BPLs may still be misaligned due to the different RTTs of each BPL.

Figure 2C:
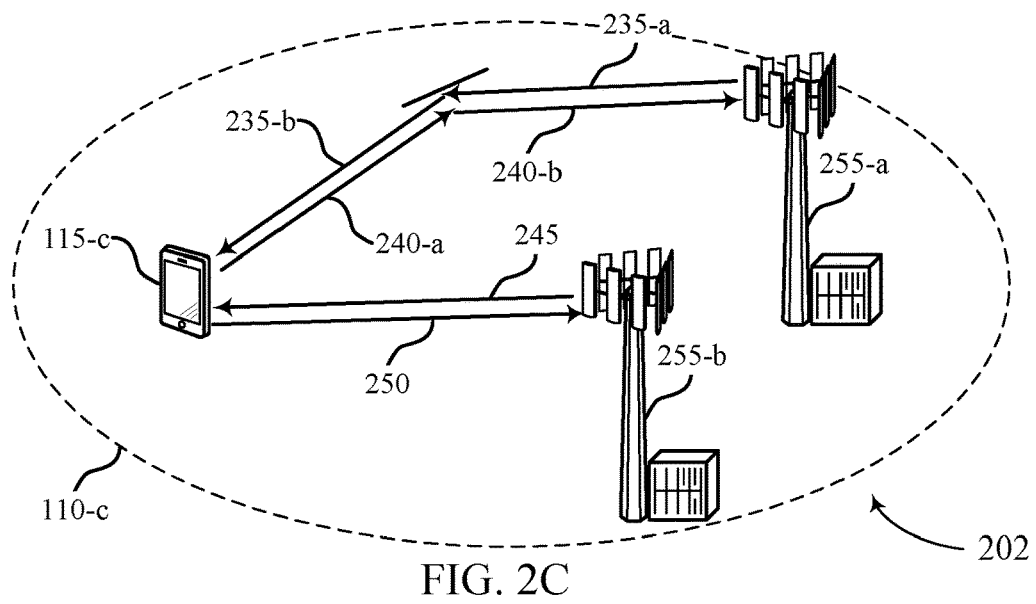

FIG. 2C illustrates another example of a wireless communications system 202 that supports handling overlapped uplink transmissions in accordance with various aspects of the present disclosure. In some examples, wireless communications system 202 may implement aspects of wireless communications systems 100, 200, and 201. Wireless communications system 202 may include a first wireless node, a second wireless node, and a third wireless node. By way of example, a first wireless node may be a network entity or a base station 105-c, and a second wireless node may be a network entity or a base station 105-d and a third wireless node may be a UE 115-c. In some examples, a network entity may communicate with UEs 115 through a number of other access network transmission entities, which may be referred to as a radio head, a smart radio head, or a transmission/reception point (TRP). In other examples, any of the wireless nodes may be may be a UE, a base station, or a network entity.

In some examples, UE 115-c may communicate with TRP 255-a and TRP 255-b via multiple BPLs (e.g., BPL 235, 240, 245, and 250). In some cases, RTTs for BPLs 245 and 250 may be different despite their reciprocity, due to mobility of UE 115-c. In some cases, RTTs for BPLs 245 and 250, and RTTs for BPLs 235 and 240, may be different, even while UE 115-c communicates simultaneously with TRP 255-a and TRP 255-b, each of which may be associated with the same base station 105.

In such cases, uplink transmissions may overlap in time due to timing misalignments. This may result in uplink transmissions suffering from collisions and interference due to timing misalignments. Furthermore, if all transmission timings corresponding to all BPLs of UE 115-b are realigned using the same TA value, in some cases one or more BPLs may still be misaligned due to the different RTTs of each BPL.

Referring to FIGS. 2A, 2B, and 2C, a UE 115 and a base station 105 communicating via multiple BPLs may experience a first scheduled signal and a second scheduled signal overlapping in time due to a misalignment between the TAs of the two signals. In some wireless communications systems, a UE 115 may not transmit the overlapped portion of the second signal. However, if a UE 115 is utilizing different transmission types or different communication configurations, automatically dropping the overlapped portion of the second signal may not be desirable due to decreased performance and throughput.

In some examples, a UE 115 may determine whether to drop a portion of the second signal. In some examples, UE 115 may identify a first value for a communication parameter for the first signal, and a second value for the communication parameter for the second signal. UE 115 may determine whether to drop a portion of the second signal by comparing the first value to the second value. In other examples, UE 115 may identify a first communication configuration to be used for the first signal, and a second communication configuration to be used for the second signal. UE 115 may determine whether to drop a portion of the second signal based on the first communication configuration and the second communication configuration. In some examples, UE 115 may determine whether to drop a portion of the second signal by identifying one or more rules used to resolve communication conflicts. In some examples, a UE 115 may schedule the first signal and the second signal to eliminate at least a portion of the overlap time.

In some examples, a base station 105 may identify a first signal to be transmitted by a UE 115 using a first BPL, and a second signal to be transmitted by the UE 115 or another UE 115 using the first BPL. Base station 105 may identify misalignment between a first TA value for the first BPL and a second TA value for the second BPL, and the misalignment may cause an overlap in time between the first signal and the second signal if the first signal is scheduled during a first time duration and the second signal is scheduled during a second time duration adjacent, or during, the first time duration. Base station 105 may schedule the first signal and the second signal to eliminate at least a portion of the overlap in time.

Figure 3:
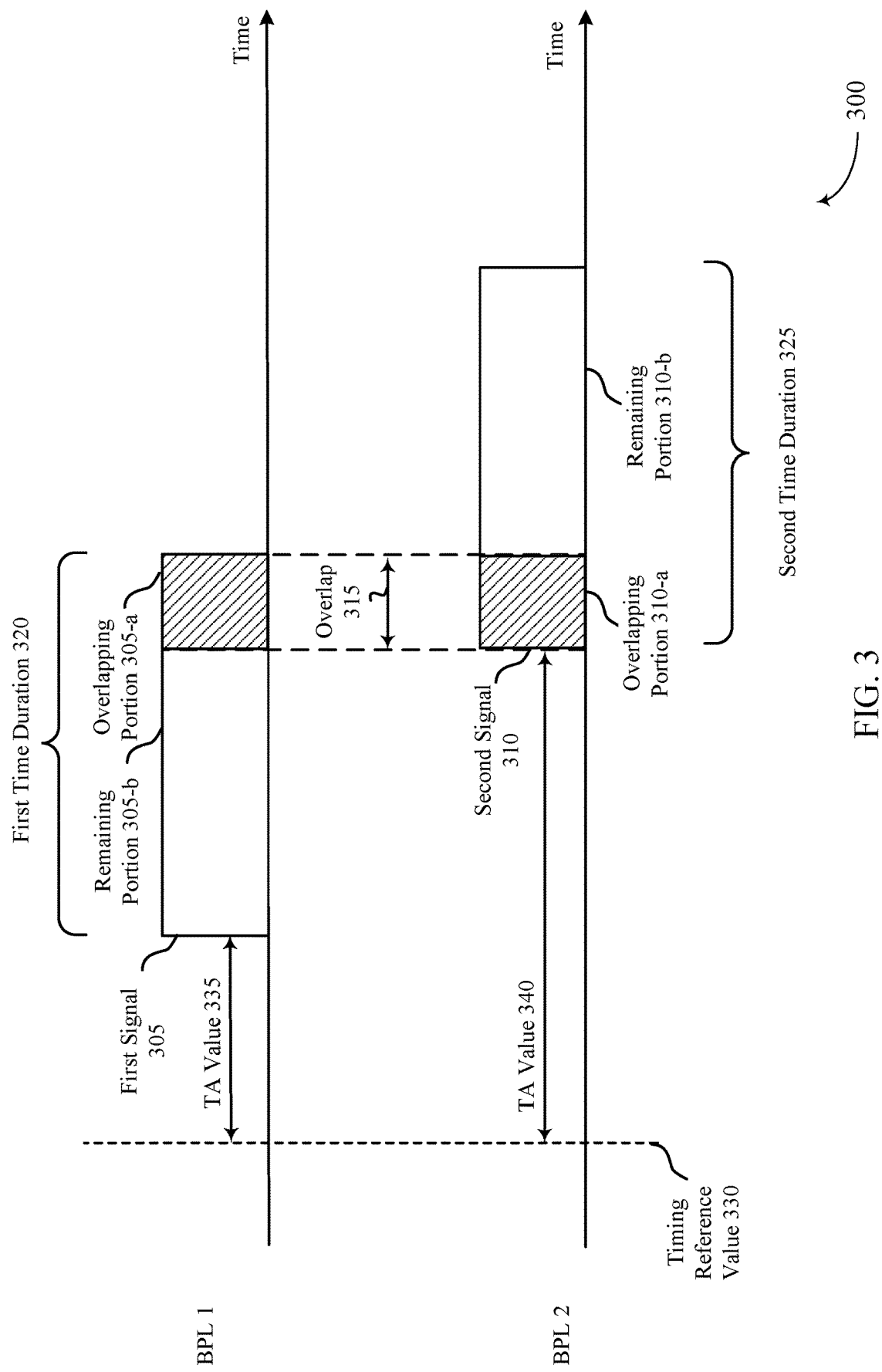
FIG. 3 illustrates an example of an overlapping communication configuration that supports handling overlapped uplink transmissions in accordance with aspects of the present disclosure.

FIG. 3 illustrates an example of an overlapping communication configuration 300 that supports handling overlapped uplink transmissions in accordance with various aspects of the present disclosure. In some examples, overlapping communication configuration 300 may implement aspects of wireless communications system 100. Techniques used in overlapping communication configuration 300 may be executed by a UE 115 and a base station 105, which may be examples of corresponding devices as described with reference to wireless communications systems 100, 200, 201, and 202.

In some examples, a UE 115 may communicate with a base station 105 via multiple BPLs, such as BPL1 and BPL2. Base station 105 may schedule an uplink signal, such as first signal 305 having a first time duration 320 on BPL1 and second signal 310 having a second time duration 325 on BPL2. First time duration 320 and second time duration 325 may be consecutive (e.g., adjacent) time durations, and may be any one of a symbol period, a slot duration, a non-slot duration (e.g., a set of symbol periods, such as 2, 4, or 7 symbol periods), or a subframe duration, or a combination of different time durations. However, as a result of high mobility, maximum permissible exposure (MPE) issues (e.g., an uplink BPL and a downlink BPL may follow different physical paths to avoid generating a power density above a threshold), or different physical paths for BPL1 and BPL2, the transmission timing of BPL1 and BPL2 may be misaligned.

For example, BPL1 may correspond to a TA value 335. TA value 335 may correspond to a timing reference value 330 and may define a time between transmission of an uplink signal and reception at base station 105 for a particular BPL. BPL2 may correspond to a TA value 340, which may also correspond to timing reference value 330, but may be different than TA value 335. The difference between TA value 335 and TA value 340, as well as the mobility, MPE, and other issues discussed herein, may result in an uplink timing misalignment. A timing misalignment may result in an overlap 315 in time between first signal 305 and second signal 310. That is, overlapping portion 305-*a* of first signal 305 and overlapping signal 310-*a* of second signal 310 may be scheduled for the same time. If UE 115 were to send both first signal 305 and second signal 310 in their scheduled first and second time durations 320 and 325, at least one of overlapping portion 305-*a* and overlapping portion 310-*a* may suffer from collisions or interference with the other. One or both of first signal 305 and second signal 310 could be unsuccessfully received at a base station 105.

In some examples, UE 115 may identify the misalignment between TA value 335 for BPL1 and TA value 340 for BPL2. The identified misalignment between TA value 335 and TA value 340 may cause the overlap 315 in time. Upon identifying the misalignment, UE 115 may determine whether to drop (e.g., refrain from transmitting) overlapping portion 305-*a* or overlapping portion 310-*a*, drop all of either first signal 305 or second signal 310, or transmit all of both first signal 305 and second signal 310. Determining whether to drop all or a portion of one of first signal 305 and second signal 310 may be based on one or more of a variety of parameters, including a type of multiplexed signals, an amount of overlap 315, or a communication configuration.

For example, the determination to drop some or all of first signal 305 or second signal 310 may be based on the signal type of first signal 305 and second signal 310. A UE 115 may identify a priority level, or value corresponding with a type of signal. For example, either of first signal 305 or second signal 310 may be one of an a PUCCH, a SRS, a PUSCH, or a combination (e.g., a PUCCH and an SRS). Each type of signal may be correlated with a value (e.g., a priority). For example, uplink control information (UCI) may have a higher value than data transmissions, which may have a higher value than SRS transmissions. For instance if first signal 305 is a data transmission, and second signal 310 is an SRS transmission, then UE 115 may determine that first signal 305 has higher value, and may elect to at least drop overlapping portion 310-*a* of second signal 310 based on the identified signal type and corresponding value. Furthermore, different UCI formats may have different values. For example, an ACK or NACK signal may have a higher value than channel quality information (CQI) transmissions. In turn, CQI transmissions may have a higher value than an SRS. If first signal 305 is an SRS, and second signal 310 is CQI, then UE 115 may determine that second signal 310 has a higher value, and may elect to drop overlapping portion 305-*a* of first signal 305 based on the identified signal type and corresponding value. In such cases, UE 115 may transmit remaining portion 305-*b* of first signal 305, and the entirety of second signal 310 (e.g., overlapping portion 310-*a* and remaining portion 310-*b*). However, if first signal 305 is an ACK signal or a NACK signal, and second signal 310 carries CQI, then UE 115 may transmit all of first signal 305 (e.g., overlapping portion 305-*a* and remaining portion 305-*b*), transmit remaining portion 310-*b* of second signal 310, and drop overlapping portion 310-*a* of second signal 310. The values of varying signals may be known and predetermined at UE 115 and base station 105, or may be signaled to UE 115 via, for example, higher layer signaling (e.g., an RRC messages).

In some examples, deciding whether to drop all or a portion of one of first signal 305 and second signal 310 may be based at least in part on an amount of overlap 315. UE 115 may utilize a threshold overlap value in a variety of ways to determine which transmission to send, and whether to drop a portion of an overlapping transmission. The threshold overlap value may be a determined duration of time for two or more signals to overlap in transmission or reception. For example, if the overlap exceeds a threshold, UE 115 may transmit first signal 305, and may drop all of second signal 310. But, if the overlap 315 is less than a threshold, UE 115 may transmit first signal 305, drop only overlapping portion 310-*a* of second signal 310, and transmit remaining portion 310-*b* of second signal 310. Or, if overlap 315 exceeds a threshold, then UE 115 may transmit all of first signal 305, drop overlapping portion 310-*a* of signal 310, and transmit remaining portion 310-*b* of second signal 310. Alternatively, if the overlap 315 is below the threshold, then UE 115 may determine that the overlap 315 is minimal, and may transmit the entirety of both first signal 305 and second signal 310.

In some examples, deciding whether to drop all or a portion of one of first signal 305 or second signal 310 may be based on a communication configuration of first signal 305 and second signal 310. For example, first signal 305 and second signal 310 may have different uplink transmission powers. If a difference between uplink transmission powers between first signal 305 and second signal 310 is too great, then UE 115 may require some minimum amount of time to transition between the first transmission power and the second transmission power. UE 115 may determine the difference between the uplink transmission power of first signal 305 and the uplink transmission power of second signal 310, and may determine whether to drop one of overlapping portion 305-*a* or overlapping portion 310-*a* based on the difference. If the difference in uplink transmission power exceeds a threshold value or is considered too great, then UE 115 may drop, for example, all of second signal 310. This may be based at least in part on the determination that a change in transmission power between transmitting first signal 305 and transmitting second signal 310 is too large. Alternatively, if the difference in transmission power is below a threshold, UE 115 may determine to drop only overlapping portion 310-*a* of second signal 310, and may transmit all of first signal 305 and remaining portion 310-*b* of second signal 310.

In other examples, a communication configuration may include a beamforming configuration. For example, first signal 305 may be transmitted via a first antenna array, and second signal 310 may be transmitted via a second antenna array. In such examples, UE 115 may require some minimum amount of time to transition from the first antenna array for first signal 305 to a second antenna array for second signal 310. As a result of overlap 315, UE 115 may not have sufficient time to make the transition, and thus may elect to transmit first signal 305, and may drop the entirety of second signal 310. Alternatively, first signal 305 and second signal 310 may be transmitted via the same antenna array. In such cases, UE 115 may not require the same amount of time to transition between first signal 305 and second signal 310. Thus, if UE 115 determines that both first signal 305 and second signal 310 are to be transmitted via the same antenna array, UE 115 may elect to drop only overlapping portion 310-a of second signal 310, and may transmit all of first signal 305 and remaining portion 310-b of second signal 310.

In some examples, a communication configuration may include a required link budget. For example, if both first signal 305 and second signal 310 have a high MCS, then a small overlap 315 may not critically impair the transmission or reception of first signal 305 and second signal 310. In such examples, UE 115 may determine not to drop either of first signal 305 or second signal 310. Alternatively, if first signal 305 has a low MCS and second signal 310 has a high MCS, UE 115 may drop overlapping portion 305-a of first signal 305, and may transmit remaining portion 305-b of first signal 305 and all of second signal 310.

UE 115 may utilize one or more of the above described parameters. For example, UE 115 may determine whether to drop a portion of first signal 305 or second signal 310 based on both an amount of overlap and an MCS level. In such an example, if the MCS for both first signal 305 and second signal 310 is relatively low, and the amount of overlap 315 is small, then UE 115 may transmit both first signal 305 and second signal 310 in their entirety. Alternatively, if the amount of overlap 315 is high, UE 115 might elect to drop overlapping portion 310-a of second signal 310. UE 115 may utilize any combination of the above parameters to form a rule or set of rules, and may apply the rule or set of rules to signal 305 and signal 310 to determine whether to drop a portion of either transmission.

In some cases, UE 115 may determine the rule or set of rules autonomously, without additional input from base station 105. Alternatively, UE 115 may receive a rule or set of rules from base station 105, and may determine whether to drop a portion of first signal 305 or second signal 310 based on the received rules. The rule or set of rules may be received via one of a MIB, a SIB, a RMSI, an OSI, a DCI, a MAC CE, other upper layer signaling, or any combination of these messages.

In some examples, a base station 105 may determine that TA value 335 of first signal 305 and TA value 340 of second signal 310 may be misaligned, and may adjust the scheduling of the two transmissions to avoid the misalignment and resulting interference. For example, a base station 105 may review prior communications with UE 115, and may determine that subsequent communications may result in similar misalignments. Prior communications may include uplink and downlink transmissions, or may include measurement reports from UE 115. The base station may determine a misalignment in uplink transmission timing, and may infer an overlap between subsequently scheduled first signal 305 and second signal 310. Based on this determination, base station 105 may update a TA value 335 or TA value 340 for one or both of BPL1 and BPL2, or may reschedule subsequently scheduled first signal 305 and second signal 310. This adjustment or rescheduling may result in eliminating overlap 315, reducing overlap 315, or reducing the amount of overlapping portion 305-a or overlapping portion 310-a being dropped.

In some examples, UE 115 may have the flexibility to schedule its own transmissions. In such cases, UE 115 may receive an uplink grant from base station 105, and may identify a misalignment between first signal 305 on BPL1 and second signal 310 on BPL2. In such examples, UE 115 may identify a misalignment between first signal 305 and second signal 310, may determine an overlap 315 in time, and may autonomously reschedule or adjust the scheduling of first signal 305 and second signal 310 accordingly. In such examples, the overlap 315 in time may be eliminated, reduced, or a reduced amount of overlapping portion 305-a or overlapping portion 310-a being dropped.

Figure 4:
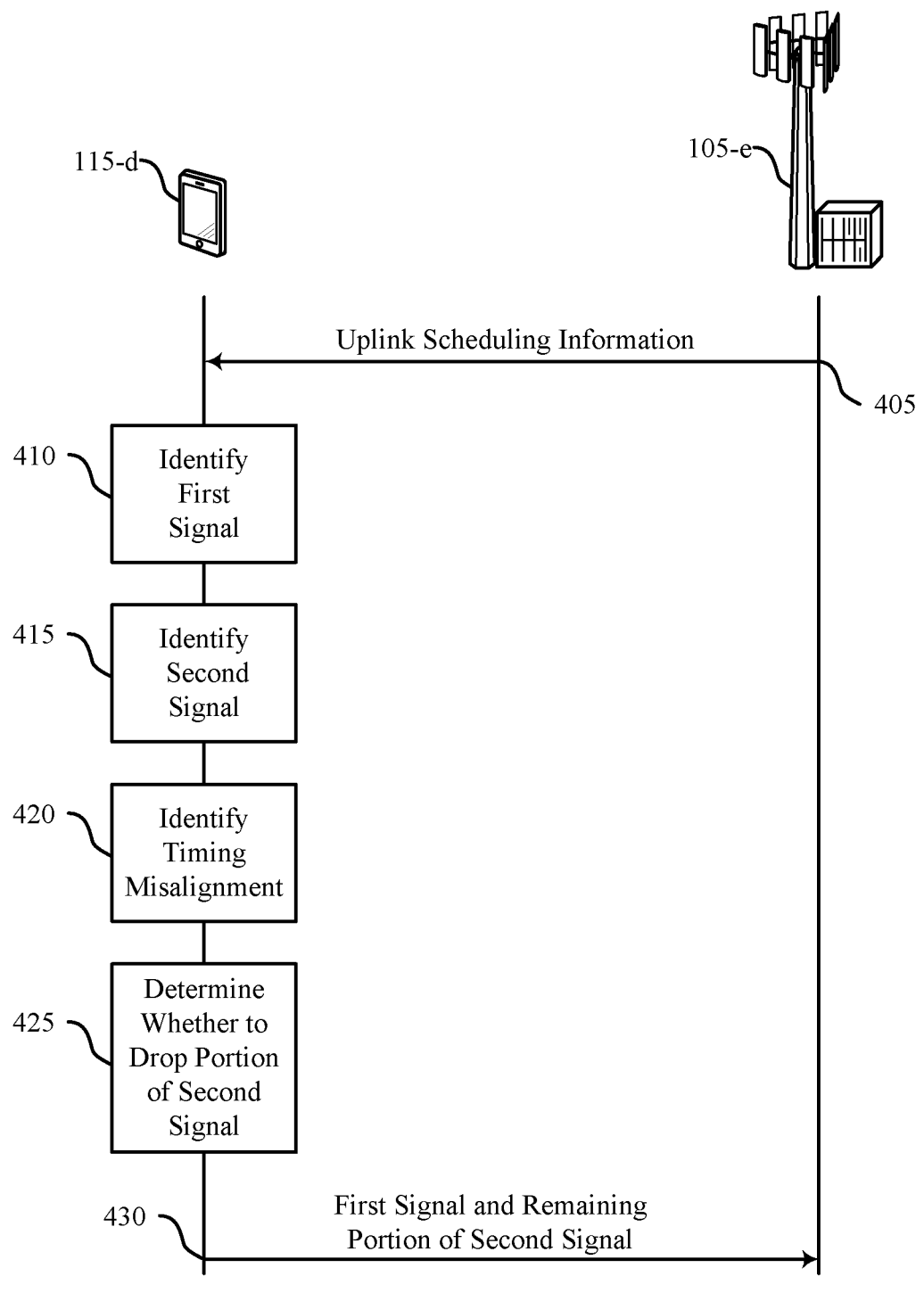
FIGS. 4 through 6 illustrate examples of a process flow that supports handling overlapped uplink transmissions in accordance with aspects of the present disclosure.

FIG. 4 illustrates an example of a process flow 400 that supports handling overlapped uplink transmissions in accordance with various aspects of the present disclosure. In some examples, process flow 400 may implement aspects of wireless communications system 100. Process flow 400 may include a first wireless node and a second wireless node. In some examples, the first wireless node may be a UE 115, and a second wireless node may be a base station 105. In some cases, a first wireless node may be a first base stations 105, and a second wireless node may be a scheduling base station 105. In some examples, a first wireless node may be a first UE 115, and a second wireless node may be a scheduling UE 115. For purpose of illustration only, the first wireless node may be referred to as UE 115-d, and the second wireless node may be referred to as base station 105-e. But, it should be understood that these are by way of example only, and that base station 105-e and UE 115-d could be examples of various wireless nodes as noted above and could be in communication with additional wireless nodes.

At 405, base station 105-e may transmit a downlink signal comprising uplink scheduling information to UE 115-d. For example, the uplink scheduling information may schedule uplink transmissions from UE 115-d across multiple BPLs.

At 410, UE 115-d may identify a first signal that is scheduled to be transmitted by UE 115-d during a first time duration using a BPL. The first signal may be scheduled via the uplink scheduling information received at 405.

At 415, UE 115-d may identify a second signal that is scheduled to be transmitted by UE 115-d during a second time duration using a second BPL. In some examples, the second time duration may be adjacent to the first time duration. In some examples, the second signal may be first in time and the first signal may be second in time. In some examples, the second signal may be scheduled via the uplink scheduling information received at 405.

In some examples, the first time duration and the second time duration may include a symbol period, or a slot duration, or a non-slot duration, or a mini-slot duration, or a subframe duration, or a combination thereof.

At 420, UE 115-d may identify a misalignment between a first TA value for the first BPL and a second TA value for the second BPL. The misalignment may cause an overlap in time between the first signal scheduled during the first time duration and the second signal scheduled during the second time duration.

At 425, UE 115-d may determine whether to drop a portion of the second signal. UE 115-d may determine to drop a portion of the second signal that is scheduled during the identified overlap in time. In some examples, UE 115-d may identify that the overlap in time exceeds a threshold value, and may determine to drop a portion of the second signal based on the overlap in time exceeding a threshold value. In other examples, UE 115-d may identify that the overlap in time does not exceed a threshold value, and may determine to transmit both the first signal and the second signal based on the overlap in time not exceeding a threshold value.

In some examples, UE 115-d may identify a first value for a communication parameter for the first signal, and a second value for the communication parameter for the second signal. In some examples, UE 115-d may determine whether to drop a portion of the second signal by comparing the first value to the second value. The communication parameter may include a communication priority, or a type of communication, or a combination thereof. The transmission type, for example, may include a physical random access channel (PRACH), or a PUSCH, or a PUCCH, or a SRS, or a combination thereof.

In some examples, UE 115-d may identify a first communication configuration to be used for the first signal, and a second communication configuration to be used for the second signal. In some examples, UE 115-d may determine whether to drop a portion of the second signal based at least in part on the first communication configuration and the second communication configuration. The communication configuration may include an uplink transmission power, or a beamforming configuration, or a link budget, or a combination thereof.

In some examples, UE 115-d may determine whether to drop a portion of the second signal based on identifying one or more rules used to resolve communication conflicts. In some examples, base station 105-e may transmit, to UE 115-d, one or more rules used to resolve communication conflicts. UE 115-d may receive the one or more rules from base station 105-e. In other examples, UE 115-d may receive the one or more rules via an MIB, an SIB, a RMSI, an OSI, a RRC message, DCI, a MAC CE, or a combination thereof.

At 430, UE 115-d may transmit the first signal and a remaining portion of the second signal based on the determining.

Figure 5:
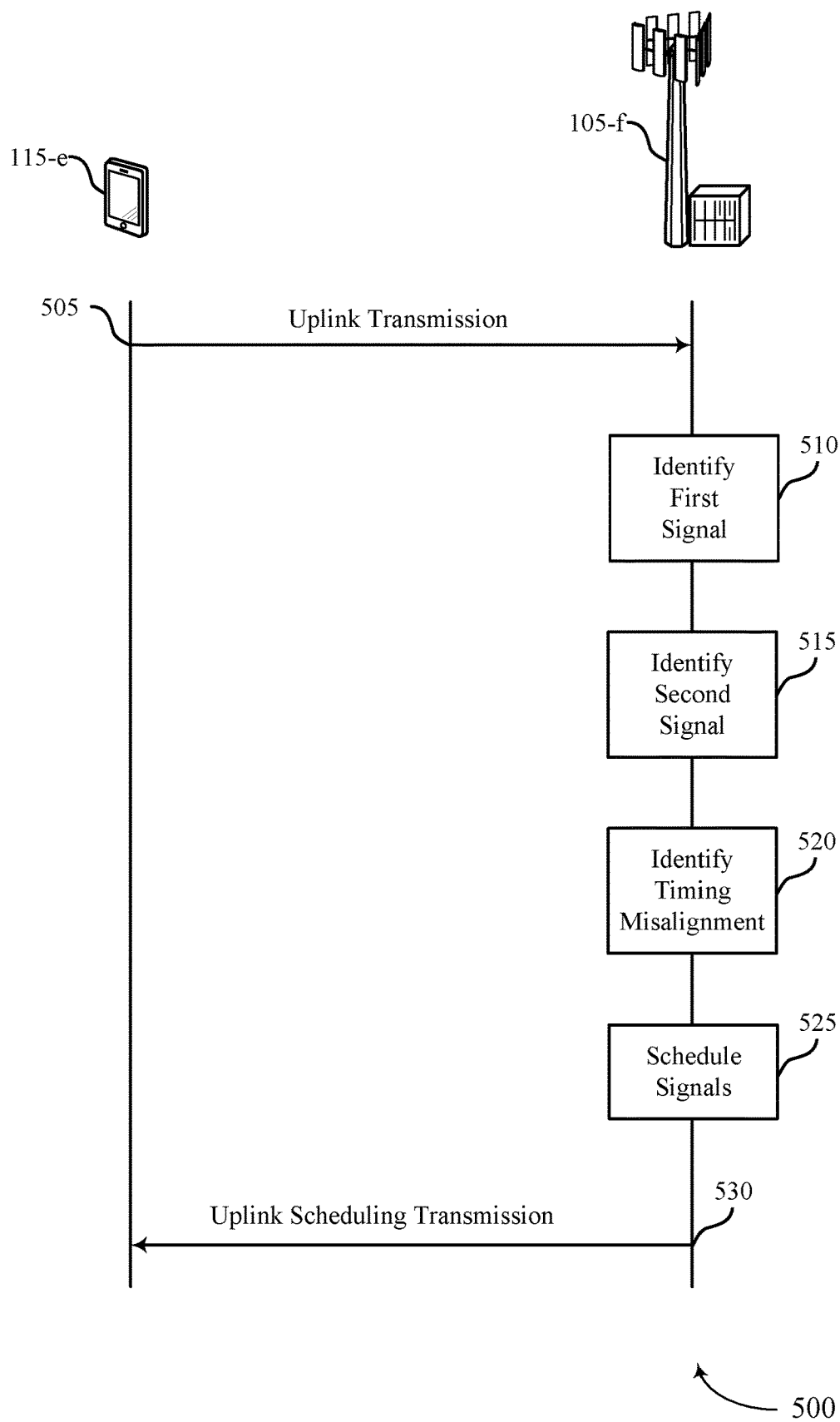

FIG. 5 illustrates an example of a process flow 500 that supports handling overlapped uplink transmissions in accordance with various aspects of the present disclosure. In some examples, process flow 500 may implement aspects of wireless communications system 100. Process flow 500 may include a first wireless node and a second wireless node. In some examples, the first wireless node may be a base station 105 and a second wireless node may be a UE 115. In some cases, a first wireless node may be a UE 115 and a second wireless node may be a UE 115. In some examples, a first wireless node and a second wireless node may be the same wireless node. For purpose of illustration only, the first wireless node may be referred to as base station 105-f, and the second wireless node may be referred to as UE 115-e. But, it should be understood that these are by way of example only, and that base station 105-f and UE 115-e could be examples of various wireless nodes as noted above and could be in communication with additional wireless nodes.

At 505, UE 115-e may transmit an uplink signal to base station 105-f. The uplink transmission may include, for example, a measurement report, or may be a scheduled uplink data transmission.

At 510, base station 105-f may identify a first signal that is scheduled to be received at or transmitted by UE 115-e during a first time duration using a first BPL. At 515, base station 105-f may identify a second signal that is scheduled to be received at or transmitted by UE 115-e during a second time duration using a second BPL. In some examples, the first time duration and the second time duration may include a symbol period, a slot duration, a non-slot duration comprising a number of symbol periods, a subframe duration, or a combination thereof.

At 520, base station 105-f may identify a misalignment between a first TA value for the first BPL and a second TA value for the second BPL. The identification of the misalignment may be based on the uplink transmission made by UE 115-e at 505. For example, base station 105-f may infer or otherwise determine a timing misalignment based on a received uplink data transmission, or may access measurement reports transmitted by UE 115-e at 505, and may determine the misalignment based on the uplink transmission. The misalignment may cause an overlap in time between the first signal and the second signal when the first signal is scheduled during a first time duration and the second signal is scheduled during a second time duration adjacent to the first time duration.

At 525, base station 105-f may schedule the first signal and the second signal to eliminate at least a portion of the overlap in time, and may transmit an indication of the schedule to UE 115-e.

At 530, base station 105-f may transmit, to UE 115-e, an indication of the scheduling. In some examples, base station 105-f may transmit one or more rules used to resolve communication conflicts. In some examples, base station 105-f may transmit the one or more rules via an MIB, or a SIB, or an RMSI, or an OSI, or an RRC message, or a DCI, or a MAC CE, or a combination thereof.

Figure 6:
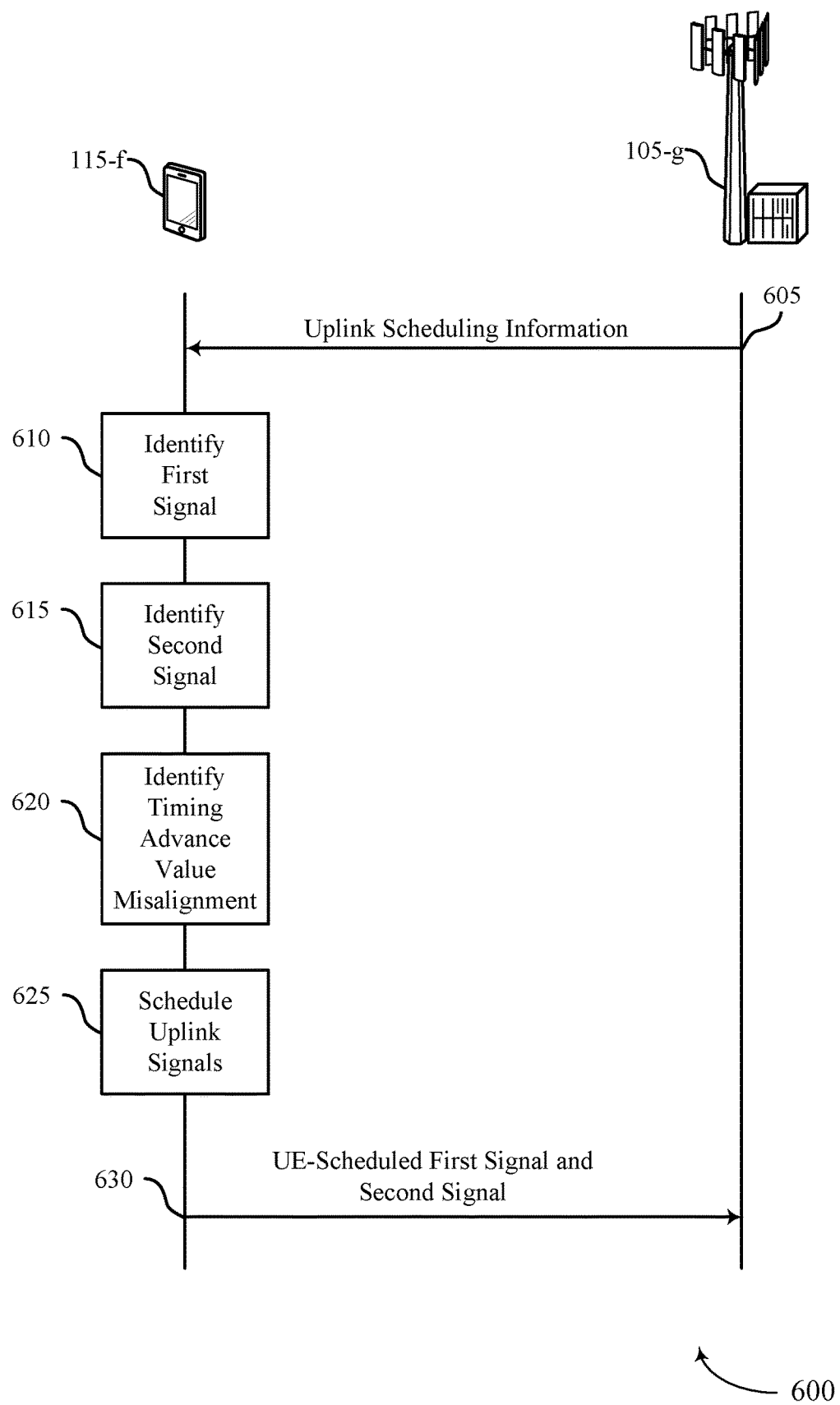

FIG. 6 illustrates an example of a process flow 600 that supports handling overlapped uplink transmissions in accordance with various aspects of the present disclosure. In some examples, process flow 600 may implement aspects of wireless communications system 100. Process flow 600 may include a first wireless node and a second wireless node. In some examples, the first wireless node may be a UE 115 and a second wireless node may be a base station 105. In some cases, a first wireless node may be a first base stations 105 and a second wireless node may be a scheduling base station 105. In some examples, a first wireless node may be a first UE 115 and a second wireless node may be a scheduling UE 115. For purpose of illustration only, the first wireless node may be referred to as UE 115-f, and the second wireless node may be referred to as base station 105-g. But, it should be understood that these are by way of example only, and that base station 105-g and UE 115-f could be examples of various wireless nodes as noted above and could be in communication with additional wireless nodes.

At 605, base station 105-g may transmit a downlink signal comprising uplink scheduling information. The scheduling information may include scheduling for communications of a first signal on a first BPL and a second signal on a second BPL.

At 610, UE 115-f may identify a first signal that is scheduled to be transmitted by UE 115-f during a first time duration using a first BPL. The first signal may have been scheduled by the uplink scheduling information received at 604. At 615, UE 115-f may identify a second signal that is scheduled to be transmitted by UE 115-f during a second time duration using a second BPL, and the second time duration may be adjacent to the first time duration. In some examples, the second signal may be first in time and the first signal may be second in time. Or, the first signal may be first in time and the second signal may be second in time. The second signal may have been scheduled according to the uplink scheduling information received at 604. In some examples, the first time duration and the second time duration may include a symbol period, a slot duration, a non-slot duration, a mini-slot duration, a subframe duration, or a combination thereof.

At 620, UE 115-f may identify a misalignment between a first TA value for the first BPL and a second TA value for the second BPL. The misalignment may cause an overlap in time between the first signal scheduled during the first time duration and the second signal scheduled during the second time duration.

At 625, UE 115-f may schedule the first signal and the second signal to eliminate at least a portion of the overlap in time, and may transmit the first signal and a remaining portion of the second signal based on the scheduling.

At 630, UE 115-$f$ may transmit the first signal and the second signal based at least in part on the scheduling.

Figure 7:
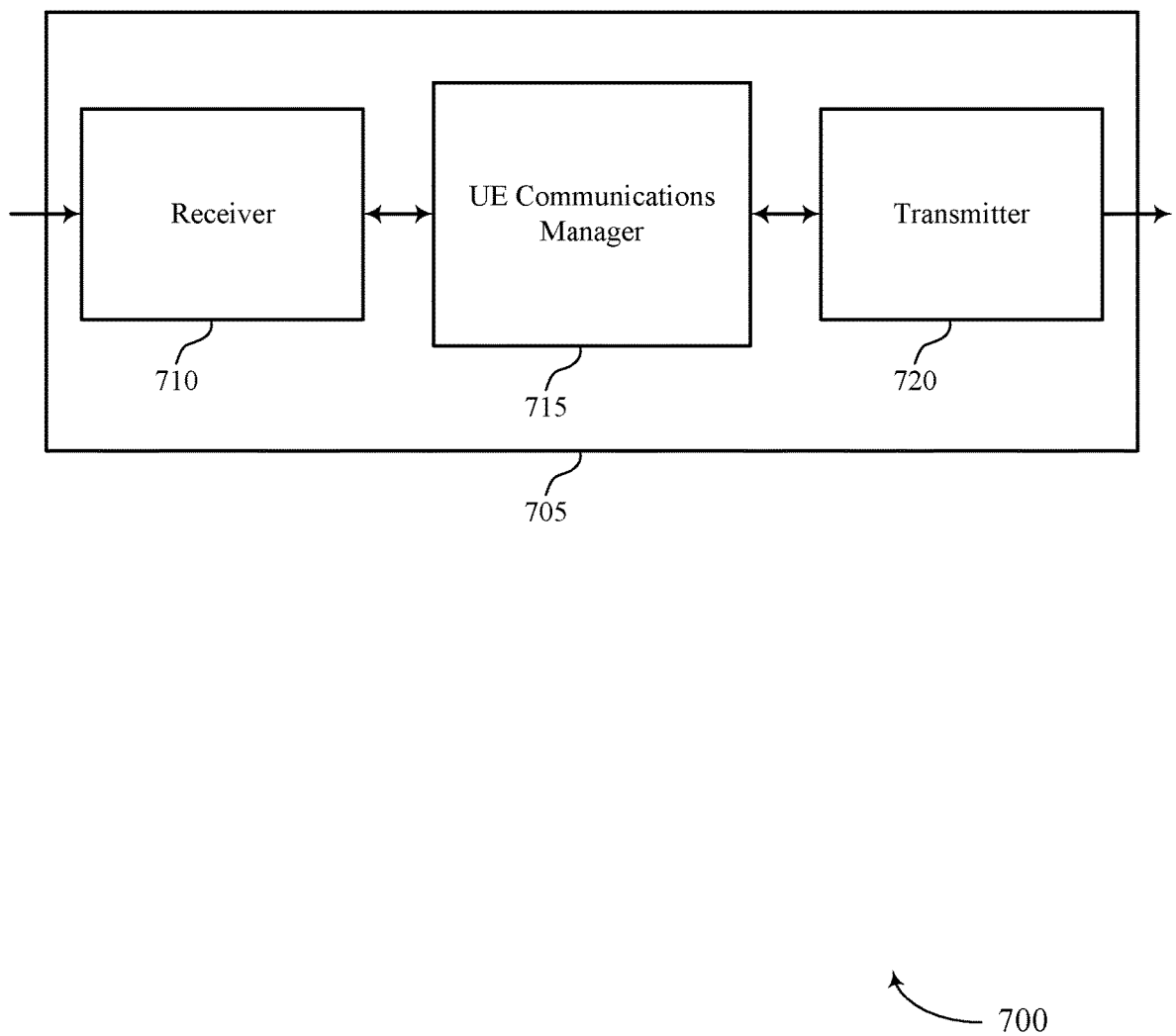
FIGS. 7 through 9 show block diagrams of a device that supports handling overlapped uplink transmissions in accordance with aspects of the present disclosure.

FIG. 7 shows a block diagram 700 of a wireless device 705 that supports handling overlapped uplink transmissions in accordance with aspects of the present disclosure. Wireless device 705 may be an example of aspects of a UE 115 as described herein. Wireless device 705 may include a receiver 710, a UE communications manager 715, and a transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, scheduling information, and information related to handling overlapped transmissions, etc.). Information may be passed on to other components of wireless device 705. The receiver 710 may be an example of aspects of the transceiver 1035 described with reference to FIG. 10. The receiver 710 may utilize a single antenna or a set of antennas.

UE communications manager 715 may be an example of aspects of the UE communications manager 1015 described with reference to FIG. 10. UE communications manager 715 and/or at least some of its various sub-components may be implemented in hardware, software executed by a processor, firmware, or any combination thereof. If implemented in software executed by a processor, the functions of the UE communications manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 715 and/or at least some of its various sub-components may be physically located at various positions, including being distributed such that portions of functions are implemented at different physical locations by one or more physical devices. In some examples, UE communications manager 715 and/or at least some of its various sub-components may be a separate and distinct component in accordance with various aspects of the present disclosure. In other examples, UE communications manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 715 may identify a first signal that is scheduled to be received at or transmitted by a first wireless node during a first time duration using a first BPL. UE communications manager 715 may also identify a second signal that is scheduled to be received at or transmitted by the first wireless node during a second time duration using a second BPL. In some examples, the second time duration is adjacent to the first time duration. UE communications manager 715 may also identify a misalignment between a first timing advance value for the first BPL and a second timing advance value for the second BPL, the misalignment causing an overlap in time between the first signal scheduled during the first time duration and the second signal scheduled during the second time duration, UE communications manager 715 may determine whether to drop a portion of the second signal, and transmit the first signal and a remaining portion of the second signal based on the determining.

Transmitter 720 may transmit signals generated by other components of wireless device 705. In some examples, transmitter 720 may be collocated with receiver 710 in a transceiver module. For example, transmitter 720 may be an example of aspects of transceiver 1035 described with reference to FIG. 10. Transmitter 720 may utilize a single antenna or a set of antennas.

Figure 8:
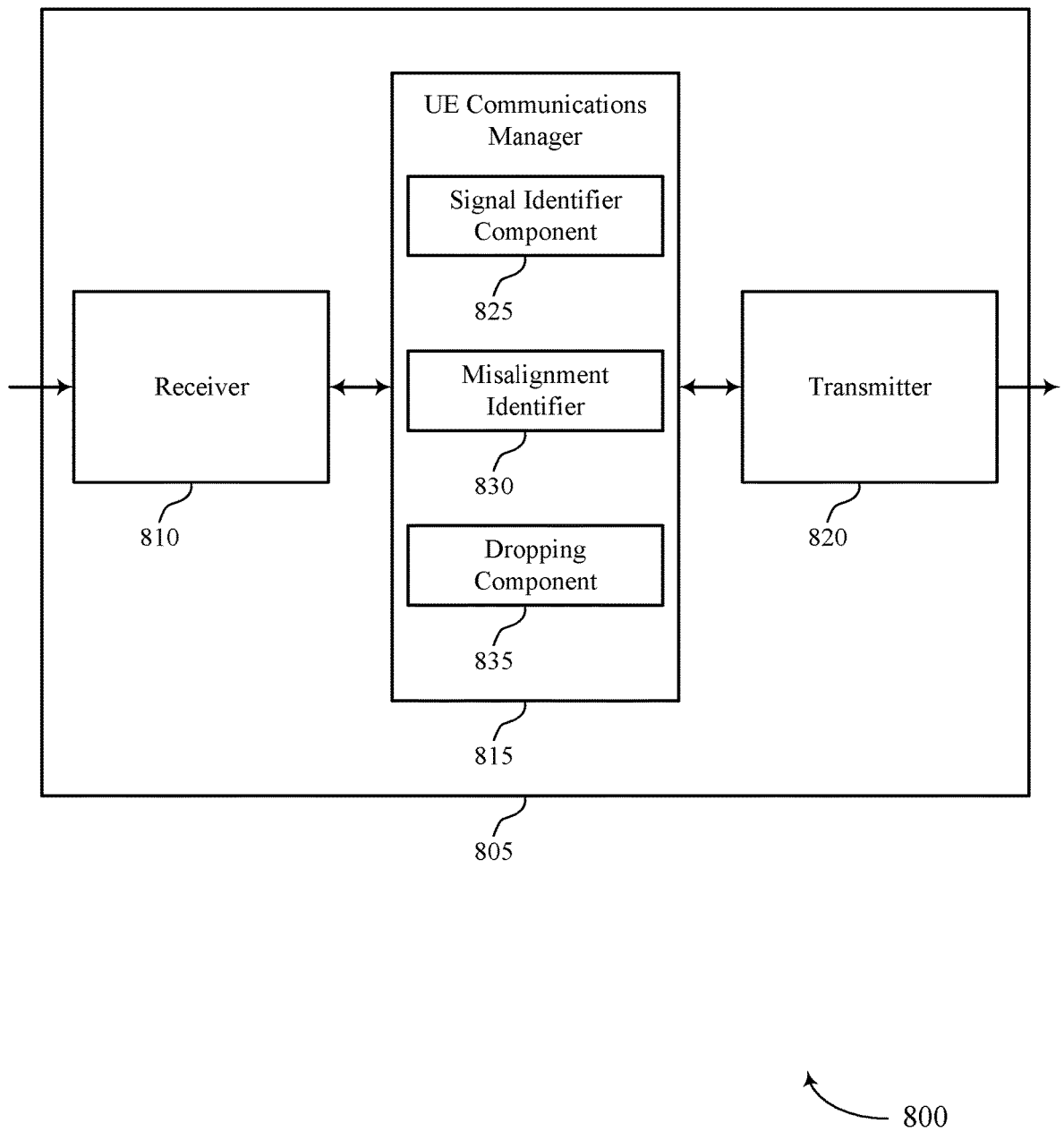

FIG. 8 shows a block diagram 800 of a wireless device 805 that supports handling overlapped uplink transmissions in accordance with aspects of the present disclosure. Wireless device 805 may be an example of aspects of a wireless device 705 or a UE 115 as described with reference to FIG. 7. Wireless device 805 may include a receiver 810, a UE communications manager 815, and a transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to handling overlapped uplink transmissions, etc.). Information may be passed on to other components of wireless device 805. Receiver 810 may be an example of aspects of transceiver 1035 described with reference to FIG. 10. Receiver 810 may utilize a single antenna or a set of antennas.

UE communications manager 815 may be an example of aspects of the UE communications manager 1015 described with reference to FIG. 10. UE communications manager 815 may also include a signal identifier component 825, a misalignment identifier 830, and a dropping component 835.

Signal identifier component 825 may identify a first signal that is scheduled to be received at or transmitted by the first wireless node during a first time duration using a first BPL and identify a second signal that is scheduled to be received at or transmitted by the first wireless node during a second time duration using a second BPL. The second time duration may be adjacent to, or overlap with, the first time duration. In some cases, the first wireless node is a UE and a second wireless node is a base station. In some cases, the first wireless node is a first base station, and a second wireless node is a scheduling base station. In some cases, the first wireless node is a first UE and a second wireless node is a scheduling UE. In some cases, the first wireless node is a first UE and a second wireless node is a second UE. In some cases, the second signal is first in time, and the first signal is second in time.

Misalignment identifier 830 may identify a misalignment between a first timing advance value for the first BPL and a second timing advance value for the second BPL, the misalignment causing an overlap in time between the first signal scheduled during the first time duration and the second signal scheduled during the second time duration. Misalignment identifier 830 may also identify that the first timing advance value for the first BPL is greater than the second timing advance value.

Dropping component 835 may determine whether to drop a portion of the first or second signal, transmit the first signal and a remaining portion of the second signal based on the determining, and transmit the first signal prior to the remaining portion of the second signal. In some cases, the first wireless node determines to drop the portion of the second signal scheduled during the identified overlap in time.

Transmitter 820 may transmit signals generated by other components of wireless device 805. In some examples, transmitter 820 may be collocated with receiver 810 in a transceiver module. For example, transmitter 820 may be an example of aspects of transceiver 1035 described with reference to FIG. 10. Transmitter 820 may utilize a single antenna or a set of antennas.

Figure 9:
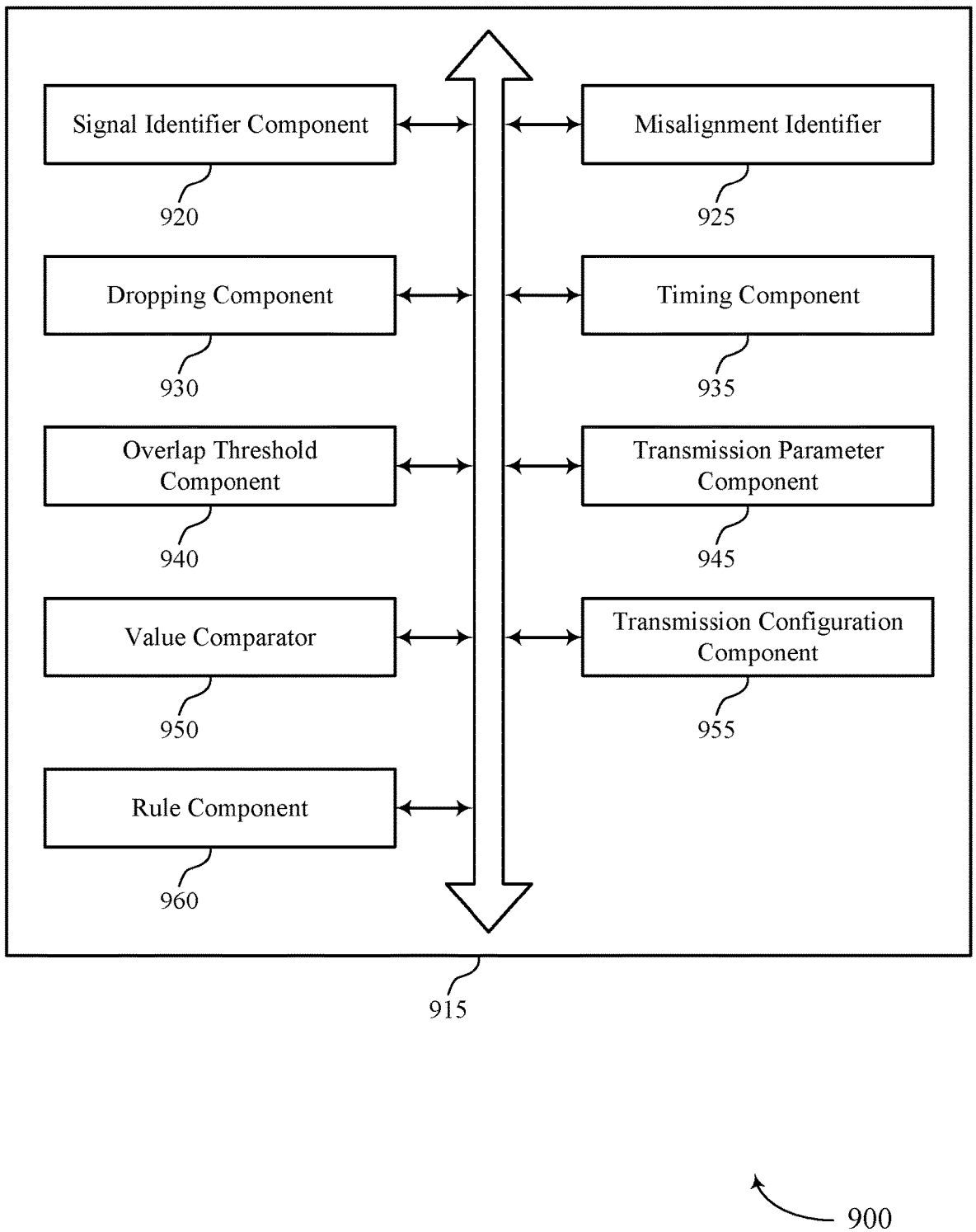

FIG. 9 shows a block diagram 900 of a UE communications manager 915 that supports handling overlapped uplink transmissions in accordance with aspects of the present disclosure. UE communications manager 915 may be an example of aspects of a UE communications manager 715, a UE communications manager 815, or a UE communications manager 1015 described with reference to FIGS. 7, 8, and 10. UE communications manager 915 may include a signal identifier component 920, a misalignment identifier 925, a dropping component 930, a timing component 935, an overlap threshold component 940, a communication parameter component 945, a value comparator 950, a communication configuration component 955, and a rule component 960. Each of these modules may communicate, directly or indirectly, with one another (e.g., via one or more buses).

Signal identifier component 920 may identify a first signal that is scheduled to be transmitted by the first wireless node during a first time duration using a first BPL and identify a second signal that is scheduled to be transmitted by the first wireless node during a second time duration using a second BPL. In some examples, the second time duration is adjacent to the first time duration. In some cases, the first wireless node is a UE and a second wireless node is a base station. In some cases, the first wireless node is a first base station, and a second wireless node is a scheduling base station. In some cases, the first wireless node is a first UE and a second wireless node is a scheduling UE. In some cases, the second signal is first in time, and the first signal is second in time.

Misalignment identifier 925 may identify a misalignment between a first timing advance value for the first BPL and a second timing advance value for the second BPL, the misalignment causing an overlap in time between the first signal scheduled during the first time duration and the second signal scheduled during the second time duration. Misalignment identifier 925 may also identify that the first timing advance value for the first BPL is greater than the second timing advance value.

Dropping component 930 may determine whether to drop a portion of the second signal, transmit the first signal and a remaining portion of the second signal based on the determining, and transmit the first signal prior to the remaining portion of the second signal. In some cases, the first wireless node determines to drop the portion of the second signal scheduled during the identified overlap in time.

Timing component 935 may identify or determine that the first time duration and the second time duration include a symbol period, a slot duration, a non-slot duration, a mini-slot, a subframe duration, or a combination thereof.

Overlap threshold component 940 may determine one or more threshold values. Overlap threshold component 940 may select which threshold value to use based at least in part on one or more communication parameters, configurations, or conditions. In some examples, another device, such as a base station 105, may indicate one or more of the threshold values. Using one of the threshold values, overlap threshold component 940 may determine to drop the portion of the second signal based on identifying that the overlap in time exceeds the threshold value and determine to transmit both the first signal and the second signal based on identifying that the overlap in time does not exceed the threshold value.

In some cases, determining whether to drop the portion of the second signal includes identifying that the overlap in time exceeds a threshold value. In some cases, determining whether to drop the portion of the second signal includes identifying that the identified overlap in time does not exceed a threshold value.

Communication parameter component 945 may identify a first value for a communication parameter for the first signal and identify a second value for the communication parameter for the second signal. In some cases, the communication parameter includes a communication priority, a type of communication, an uplink or downlink transmission to a parent or child wireless node, or a combination thereof. In some cases, the type of communication includes a physical random access channel RACH,r a PUSCH, a PUCCH, a SRS, downlink control channels, data channels, reference signals, or a combination thereof.

Value comparator 950 may compare the first value for the communication parameter to the second value for the communication parameter, where determining whether to drop the portion of the second signal is based on the comparison.

Communication configuration component 955 may identify a first communication configuration to be used for the first signal, and a second communication configuration to be used for the second signal, where determining whether to drop the portion of the second signal is based on the first communication configuration and the second communication configuration. In some cases, the communication configuration includes an uplink transmission power, or a beamforming configuration, or a link budget, or a combination thereof.

Rule component 960 may identify one or more rules used to resolve communication conflicts, where determining whether to drop the portion of the second signal is based on the one or more rules, receive the one or more rules from the second wireless node, and receive the one or more rules via a MIB, a SIB, a RMSI, an OSI, a RRC message, a DCI, a MAC CE, or a combination thereof.

Figure 10:
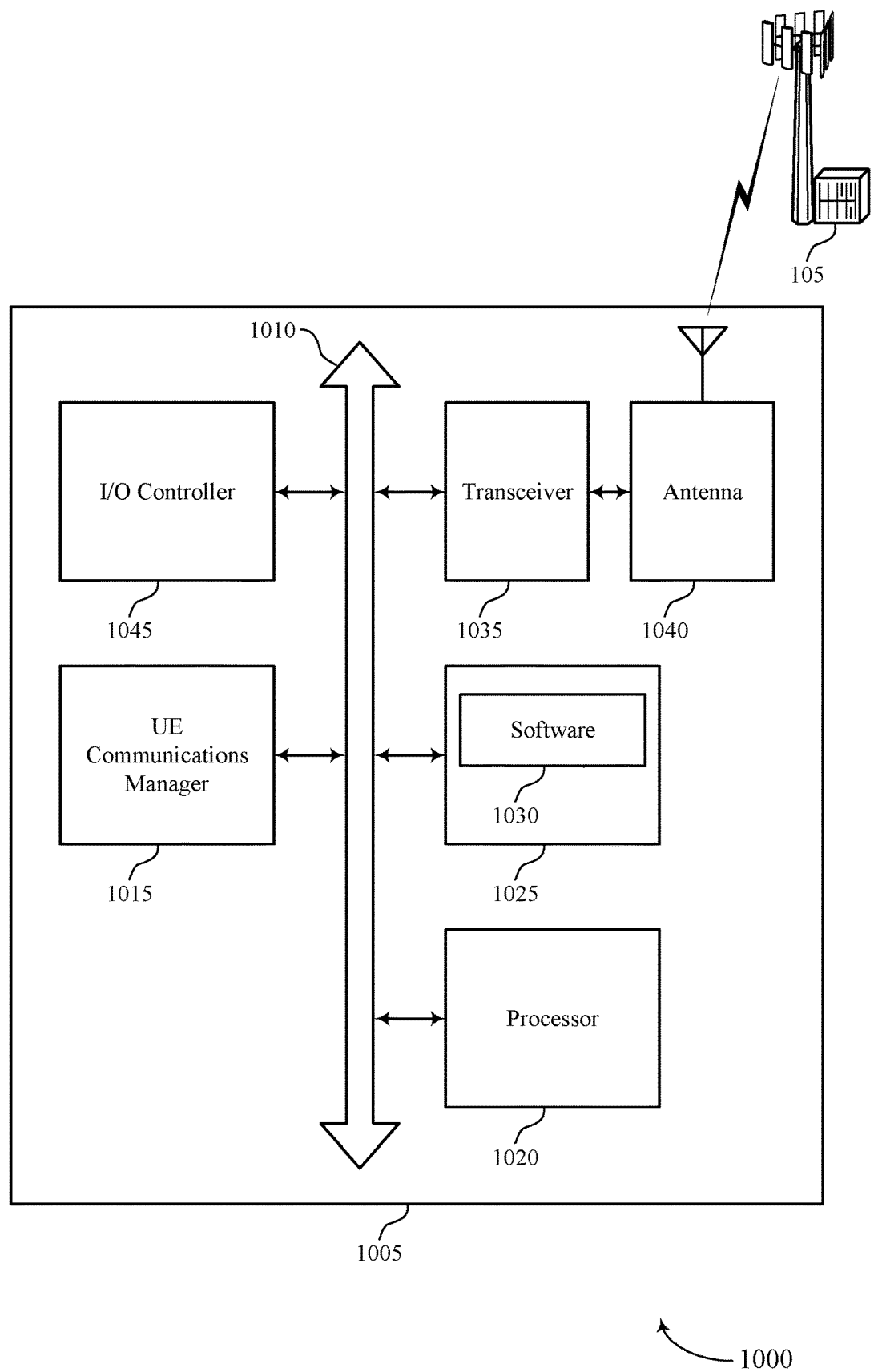
FIG. 10 illustrates a block diagram of a system including a UE that supports handling overlapped uplink transmissions in accordance with aspects of the present disclosure.

FIG. 10 shows a diagram of a system 1000 including a device 1005 that supports handling overlapped transmissions in accordance with aspects of the present disclosure. Device 1005 may be an example of or include the components of a wireless device 705, a wireless device 805, or a UE 115 as described above, e.g., with reference to FIGS. 7 and 8. Device 1005 may include components for bi-directional voice and data communications including components for transmitting and receiving communications, including a UE communications manager 1015, a processor 1020, a memory 1025, software 1030, a transceiver 1035, an antenna 1040, and an I/O controller 1045. These components may be in electronic communication via one or more buses (e.g., bus 1010). Device 1005 may communicate wirelessly with one or more UEs 115 or base stations 105.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting handling overlapped uplink transmissions).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support handling overlapped uplink transmissions. Software 1030 may be stored in a non-transitory computer-readable medium such as system memory or other memory. In some cases, software 1030 may not be directly executable by the processor but may cause a computer (e.g., when compiled and executed) to perform functions described herein.

Transceiver 1035 may communicate bi-directionally, via one or more antennas, wired, or wireless links as described above. For example, transceiver 1035 may represent a wireless transceiver and may communicate bi-directionally with another wireless transceiver. Transceiver 1035 may also include a modem to modulate the packets and provide the modulated packets to the antennas for transmission, and to demodulate packets received from the antennas.

In some cases, device 1005 may include a single antenna 1040. However, in some cases device 1005 may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
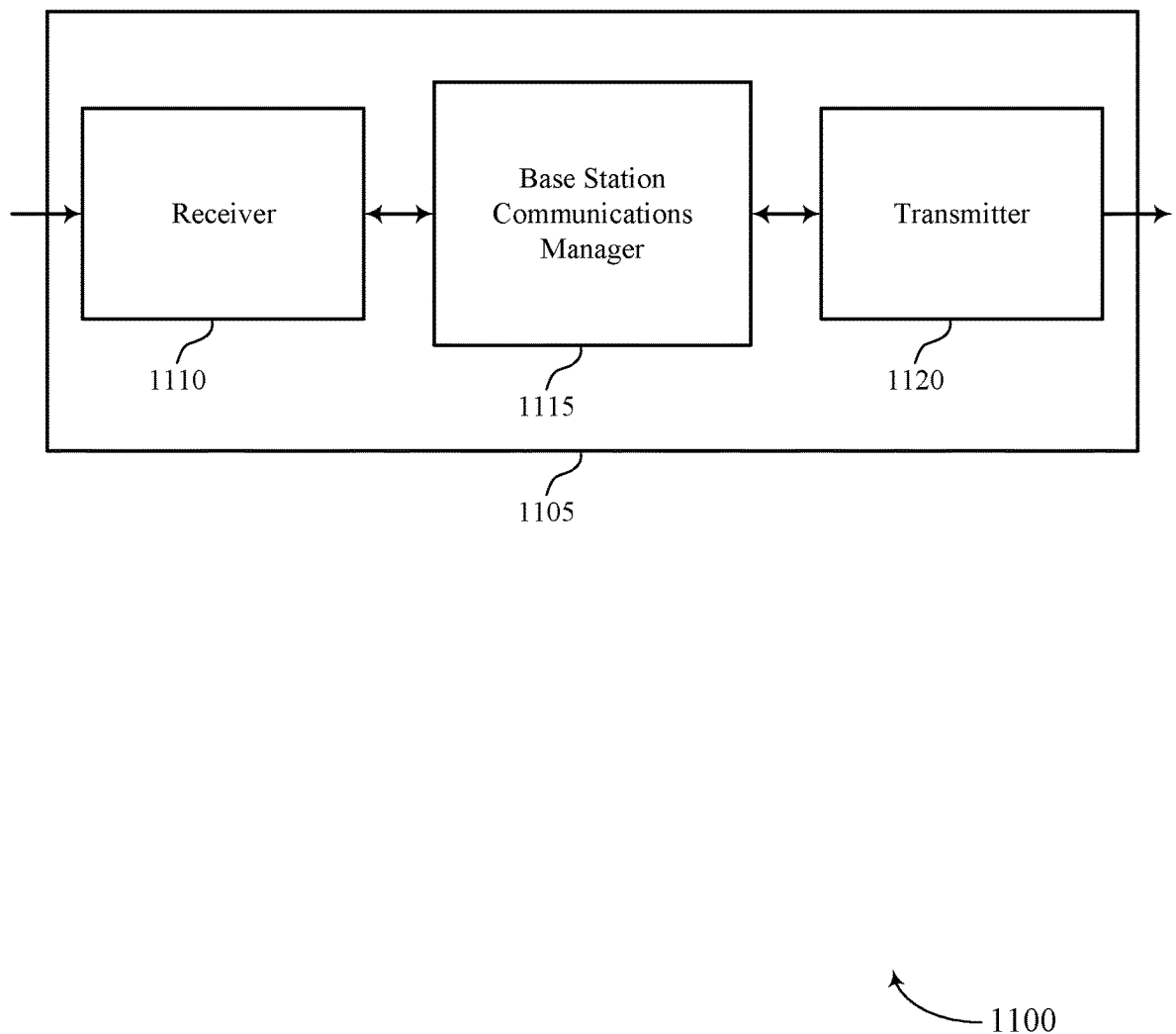
FIGS. 11 through 13 show block diagrams of a device that supports handling overlapped uplink transmissions in accordance with aspects of the present disclosure.

FIG. 11 shows a block diagram 1100 of a wireless device 1105 that supports handling overlapped uplink transmissions in accordance with aspects of the present disclosure. Wireless device 1105 may be an example of aspects of a base station 105 as described herein. Wireless device 1105 may include a receiver 1110, a base station communications manager 1115, and a transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to handling overlapped uplink transmissions, etc.). Information may be passed on to other components of wireless device 1105. Receiver 1110 may be an example of aspects of transceiver 1435 described with reference to FIG. 14. Receiver 1110 may utilize a single antenna or a set of antennas.

Base station communications manager 1115 may be an example of aspects of base station communications manager 1415 described with reference to FIG. 14. Base station communications manager 1115 and/or at least some of its various sub-components may be implemented in hardware, software executed by a processor, firmware, or any combination thereof. If implemented in software executed by a processor, the functions of base station communications manager 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. Base station communications manager 1115 and/or at least some of its various sub-components may be physically located at various positions, including being distributed such that portions of functions are implemented at different physical locations by one or more physical devices. In some examples, base station communications manager 1115 and/or at least some of its various sub-components may be a separate and distinct component in accordance with various aspects of the present disclosure. In other examples, base station communications manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1115 may identify a first signal to be transmitted by a second wireless node using a first BPL and identify a second signal to be transmitted by the second wireless node using a second BPL. Base station communications manager 1115 may identify a misalignment between a first timing advance value for the first BPL and a second timing advance value for the second BPL, the misalignment to cause an overlap in time between the first signal and the second signal if the first signal is scheduled during a first time duration and the second signal is scheduled during a second time duration adjacent to the first time duration. In some examples, base station communications manager 1115 may schedule the first signal and the second signal to eliminate at least a portion of the overlap in time.

Transmitter 1120 may transmit signals generated by other components of wireless device 1105. In some examples, transmitter 1120 may be collocated with receiver 1110 in a transceiver module. For example, transmitter 1120 may be an example of aspects of transceiver 1435 described with reference to FIG. 14. Transmitter 1120 may utilize a single antenna or a set of antennas.

Figure 12:
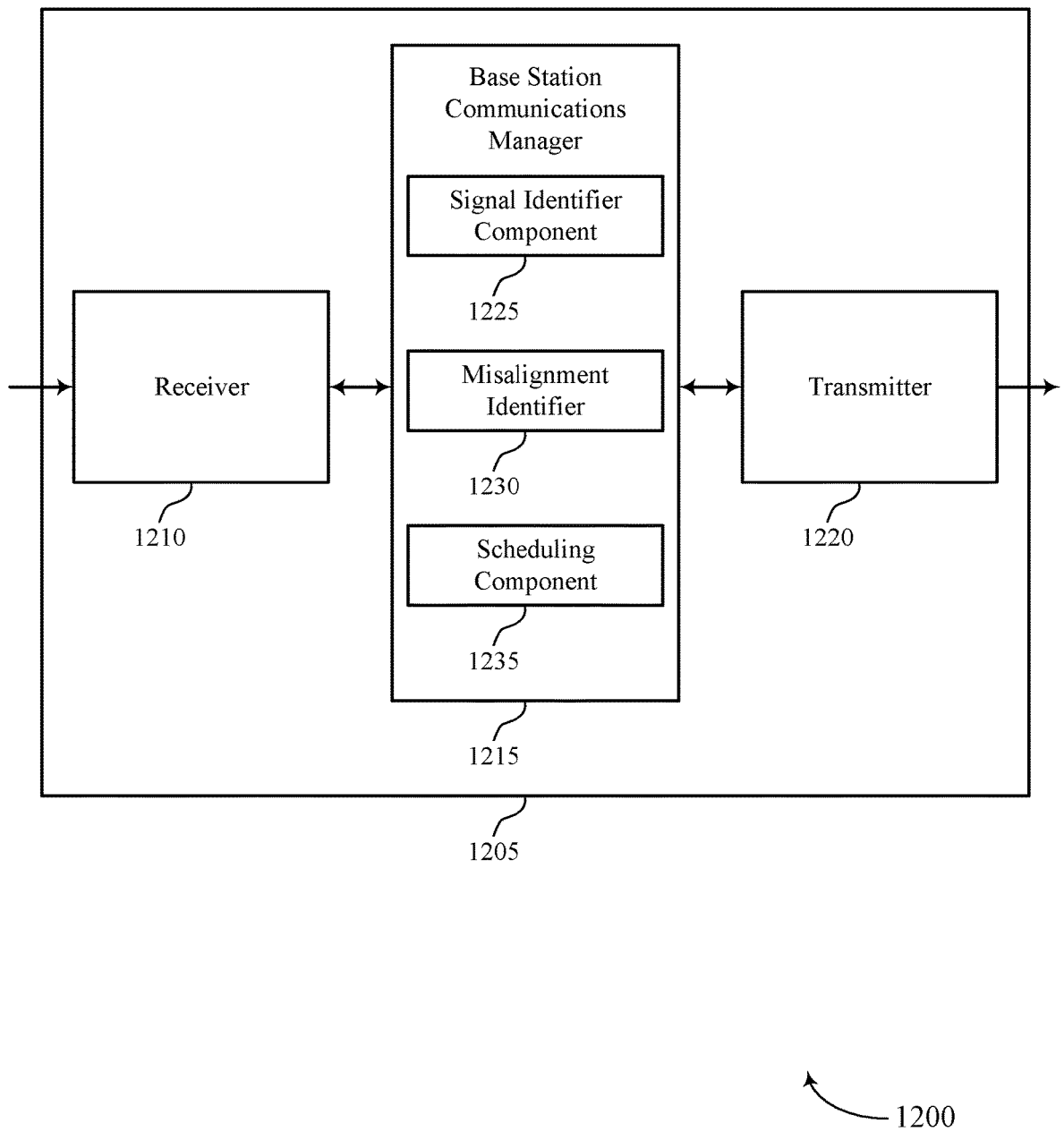

FIG. 12 shows a block diagram 1200 of a wireless device 1205 that supports handling overlapped uplink transmissions in accordance with aspects of the present disclosure. Wireless device 1205 may be an example of aspects of a wireless device 1105 or a base station 105 as described with reference to FIG. 11. Wireless device 1205 may include a receiver 1210, a base station communications manager 1215, and a transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to handling overlapped uplink transmissions, etc.). Information may be passed on to other components of wireless device 1205. Receiver 1210 may be an example of aspects of transceiver 1435 described with reference to FIG. 14. Receiver 1210 may utilize a single antenna or a set of antennas.

Base station communications manager 1215 may be an example of aspects of the base station communications manager 1415 described with reference to FIG. 14. Base station communications manager 1215 may also include a signal identifier component 1225, a misalignment identifier 1230, and a scheduling component 1235.

Signal identifier component 1225 may identify a first signal to be transmitted by a second wireless node using a first BPL and identify a second signal to be transmitted by the second wireless node using a second BPL. In some cases, the first wireless node is a base station and the second wireless node is a UE. In some cases, the first wireless node is a UE, and the second wireless node is a UE. In some cases, the first wireless node and the second wireless node are the same wireless node.

Misalignment identifier 1230 may identify a misalignment between a first timing advance value for the first BPL and a second timing advance value for the second BPL, the misalignment to cause an overlap in time between the first signal and the second signal if the first signal is scheduled during a first time duration and the second signal is scheduled during a second time duration adjacent to the first time duration.

Scheduling component 1235 may schedule the first signal and the second signal to eliminate at least a portion of the overlap in time and transmit an indication of the scheduling to the second wireless node.

Transmitter 1220 may transmit signals generated by other components of wireless device 1205. In some examples, the transmitter 1220 may be collocated with receiver 1210 in a transceiver module. For example, transmitter 1220 may be an example of aspects of transceiver 1435 described with reference to FIG. 14. Transmitter 1220 may utilize a single antenna or a set of antennas.

Figure 13:
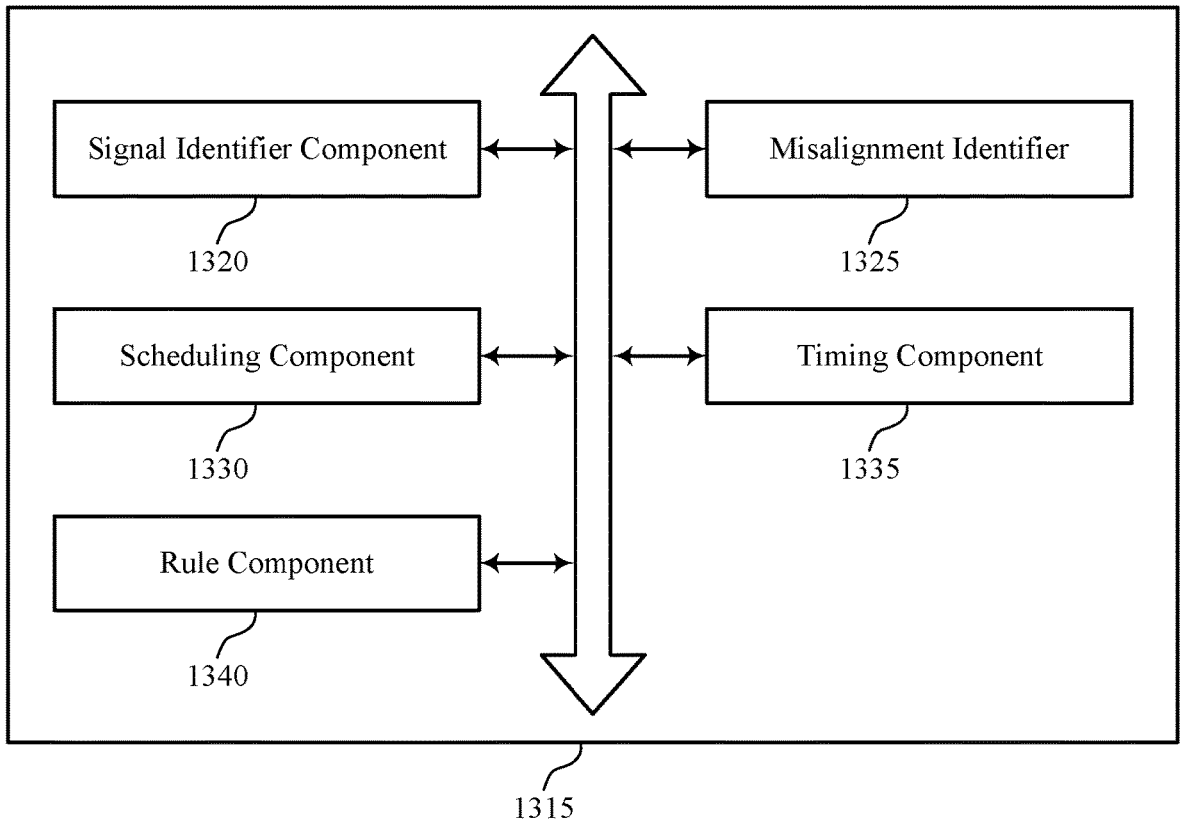

FIG. 13 shows a block diagram 1300 of a base station communications manager 1315 that supports handling overlapped uplink transmissions in accordance with aspects of the present disclosure. Base station communications manager 1315 may be an example of aspects of a base station communications manager 1415 described with reference to FIGS. 11, 12, and 14. Base station communications manager 1315 may include a signal identifier component 1320, a misalignment identifier 1325, a scheduling component 1330, a timing component 1335, and a rule component 1340. Each of these modules may communicate, directly or indirectly, with one another (e.g., via one or more buses).

Signal identifier component 1320 may identify a first signal to be transmitted by a second wireless node using a first BPL and identify a second signal to be transmitted by the second wireless node using a second BPL. In some cases, the first wireless node is a base station and the second wireless node is a UE. In some cases, the first wireless node is a UE, and the second wireless node is a UE. In some cases, the first wireless node and the second wireless node are the same wireless node.

Misalignment identifier 1325 may identify a misalignment between a first timing advance value for the first BPL and a second timing advance value for the second BPL, the misalignment to cause an overlap in time between the first signal and the second signal if the first signal is scheduled during a first time duration and the second signal is scheduled during a second time duration adjacent to the first time duration.

Scheduling component 1330 may schedule communications of at least one of the first signal and the second signal to eliminate at least a portion of the overlap in time and transmit an indication of the scheduling to the second wireless node.

Timing component 1335 may determine that the first time duration and the second time duration include a symbol period, a slot duration, a non-slot duration, a subframe duration, a mini-slot, or a combination thereof.

Rule component 1340 may transmit, to the second wireless node, one or more rules used to resolve communication conflicts. In some cases, transmitting the one or more rules includes transmitting the one or more rules via a MIB, a SIB, a RMSI, OSI, a RRC message, a DCI, a MAC CE, other upper layer signaling, or a combination thereof.

Figure 14:
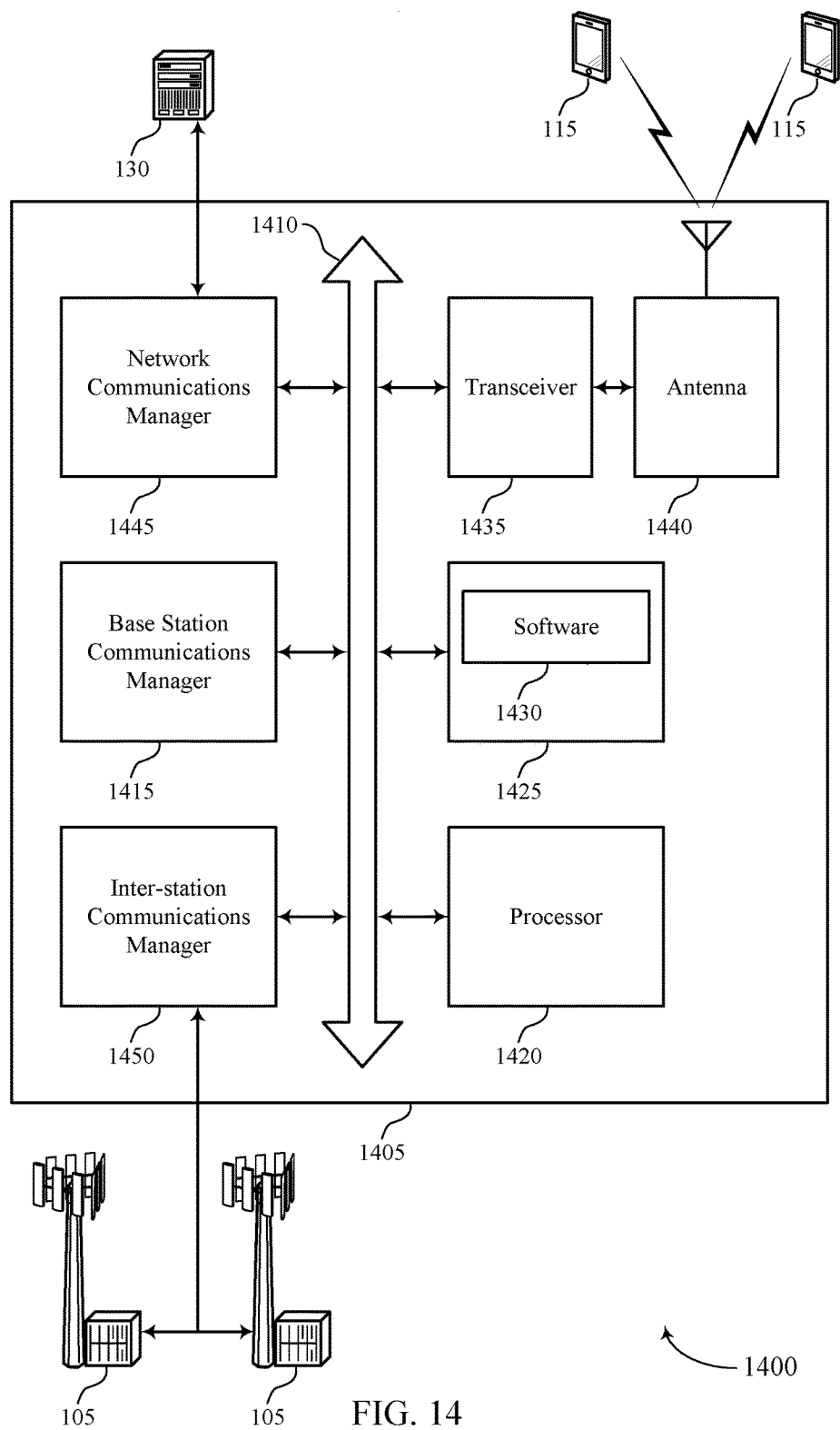
FIG. 14 illustrates a block diagram of a system including a base station that supports handling overlapped uplink transmissions in accordance with aspects of the present disclosure.

FIG. 14 shows a diagram of a system 1400 including a device 1405 that supports handling overlapped uplink transmissions in accordance with aspects of the present disclosure. Device 1405 may be an example of or include the components of base station 105 as described above, e.g., with reference to FIG. 1. Device 1405 may include components for bi-directional voice and data communications including components for transmitting and receiving communications, including a base station communications manager 1415, a processor 1420, a memory 1425, software 1430, a transceiver 1435, an antenna 1440, a network communications manager 1445, and an inter-station communications manager 1450. These components may be in electronic communication via one or more buses (e.g., a bus 1410). Device 1405 may communicate wirelessly with one or more UEs 115.

Processor 1420 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting handling overlapped uplink transmissions).

Memory 1425 may include RAM and ROM. Memory 1425 may store computer-readable, computer-executable software 1430 including instructions that, when executed, cause the processor to perform various functions described herein. In some cases, memory 1425 may contain, among other things, a BIOS which may control basic hardware or software operation such as the interaction with peripheral components or devices.

Software 1430 may include code to implement aspects of the present disclosure, including code to support handling overlapped uplink transmissions. Software 1430 may be stored in a non-transitory computer-readable medium such as system memory or other memory. In some cases, software 1430 may not be directly executable by the processor but may cause a computer (e.g., when compiled and executed) to perform functions described herein.

Transceiver 1435 may communicate bi-directionally, via one or more antennas, wired, or wireless links as described above. For example, transceiver 1435 may represent a wireless transceiver and may communicate bi-directionally with another wireless transceiver. Transceiver 1435 may also include a modem to modulate the packets and provide the modulated packets to the antennas for transmission, and to demodulate packets received from the antennas.

In some cases, device 1405 may include a single antenna 1440. However, in some cases device 1405 may have more than one antenna 1440, which may be capable of concurrently transmitting or receiving multiple wireless transmissions.

Network communications manager 1445 may manage communications with the core network (e.g., via one or more wired backhaul links). For example, the network communications manager 1445 may manage the transfer of data communications for client devices, such as one or more UEs 115.

Inter-station communications manager 1450 may manage communications with other base stations 105, and may include a controller or scheduler for controlling communications with UEs 115 in cooperation with other base stations 105. For example, inter-station communications manager 1450 may coordinate scheduling for transmissions to UEs 115 for various interference mitigation techniques such as beamforming or joint transmission. In some examples, inter-station communications manager 1450 may provide an X2 interface within an Long Term Evolution (LTE)/LTE-A wireless communication network technology to provide communication between base stations 105.

Figure 15:
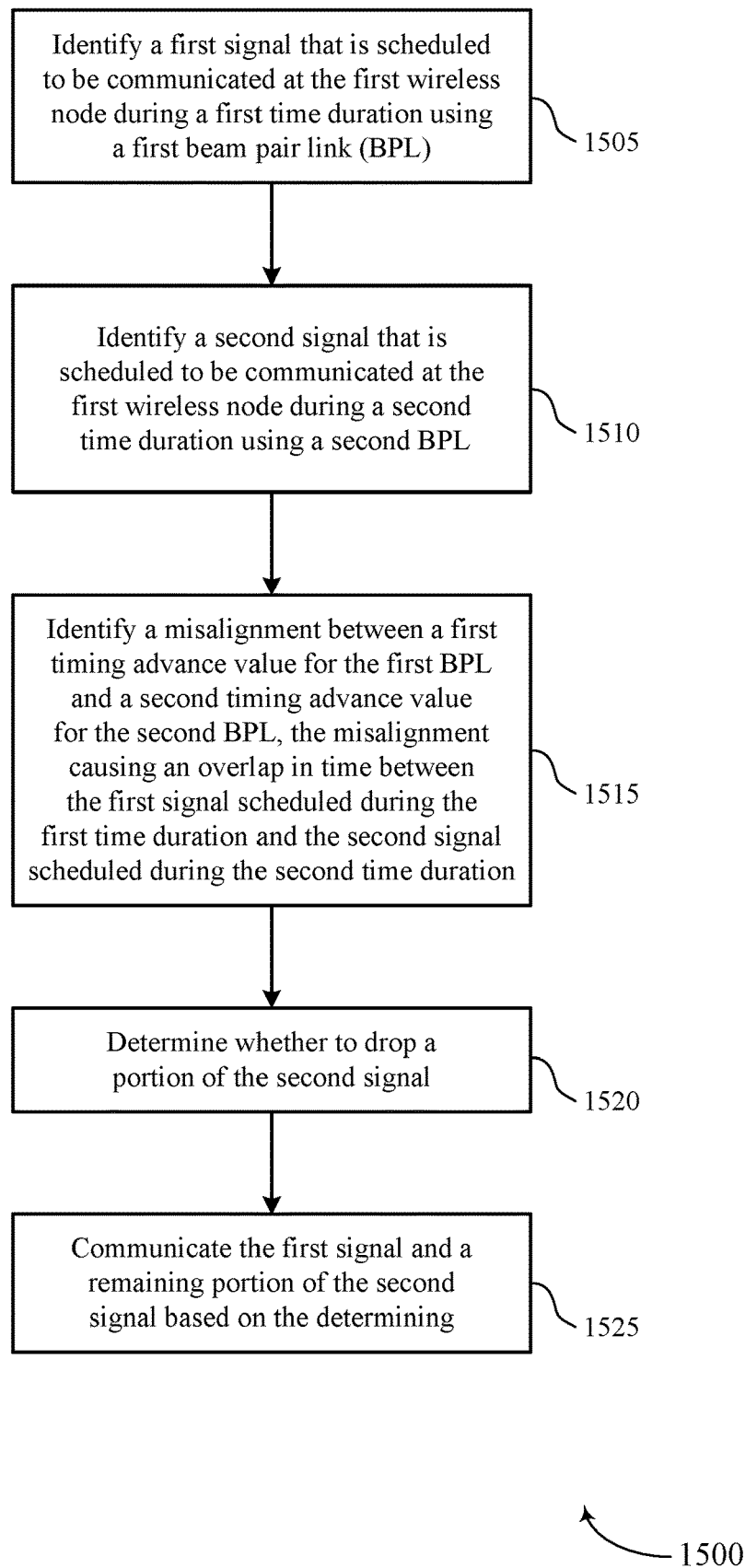
FIGS. 15 through 19 illustrate methods for handling overlapped uplink transmissions in accordance with aspects of the present disclosure.

FIG. 15 shows a flowchart illustrating a method 1500 for handling overlapped uplink transmissions in accordance with aspects of the present disclosure. The operations of method 1500 may be implemented by a UE 115 or its components as described herein. For example, the operations of method 1500 may be performed by a UE communications manager as described with reference to FIGS. 7 through 10. In some examples, a UE 115 may execute a set of codes to control the functional elements of the device to perform the functions described below. Additionally or alternatively, UE 115 may perform aspects of the functions described below using special-purpose hardware.

At 1505, UE 115 may identify a first signal that is scheduled to be communicated at the first wireless node during a first time duration using a first BPL. The operations of 1505 may be performed according to the methods described herein. In certain examples, aspects of the operations of 1505 may be performed by a signal identifier component as described with reference to FIGS. 7 through 10.

At 1510, UE 115 may identify a second signal that is scheduled to be communicated at the first wireless node during a second time duration using a second BPL. For example, the second signal may be scheduled to be transmitted by or received at the first wireless node. In another example, UE 115 may transmit both the first and the second signals. The operations of 1510 may be performed according to the methods described herein. In certain examples, aspects of the operations of 1510 may be performed by a signal identifier component as described with reference to FIGS. 7 through 10.

At 1515, UE 115 may identify a misalignment between a first timing advance value for the first BPL and a second timing advance value for the second BPL, the misalignment causing an overlap in time between the first signal scheduled during the first time duration and the second signal scheduled during the second time duration. The operations of 1515 may be performed according to the methods described herein. In certain examples, aspects of the operations of 1515 may be performed by a misalignment identifier as described with reference to FIGS. 7 through 10.

At 1520, UE 115 may determine whether to drop a portion of the second signal. The operations of 1520 may be performed according to the methods described herein. In certain examples, aspects of the operations of 1520 may be performed by a dropping component as described with reference to FIGS. 7 through 10.

At 1525, UE 115 may communicate the first signal and a remaining portion of the second signal based at least in part on the determining. For example, UE 115 ay transmit the first signal and receive the second signal. In another example, UE 115 may transmit both the first and the second signals. The operations of 1525 may be performed according to the methods described herein. In certain examples, aspects of the operations of 1525 may be performed by a dropping component as described with reference to FIGS. 7 through 10.

Figure 16:
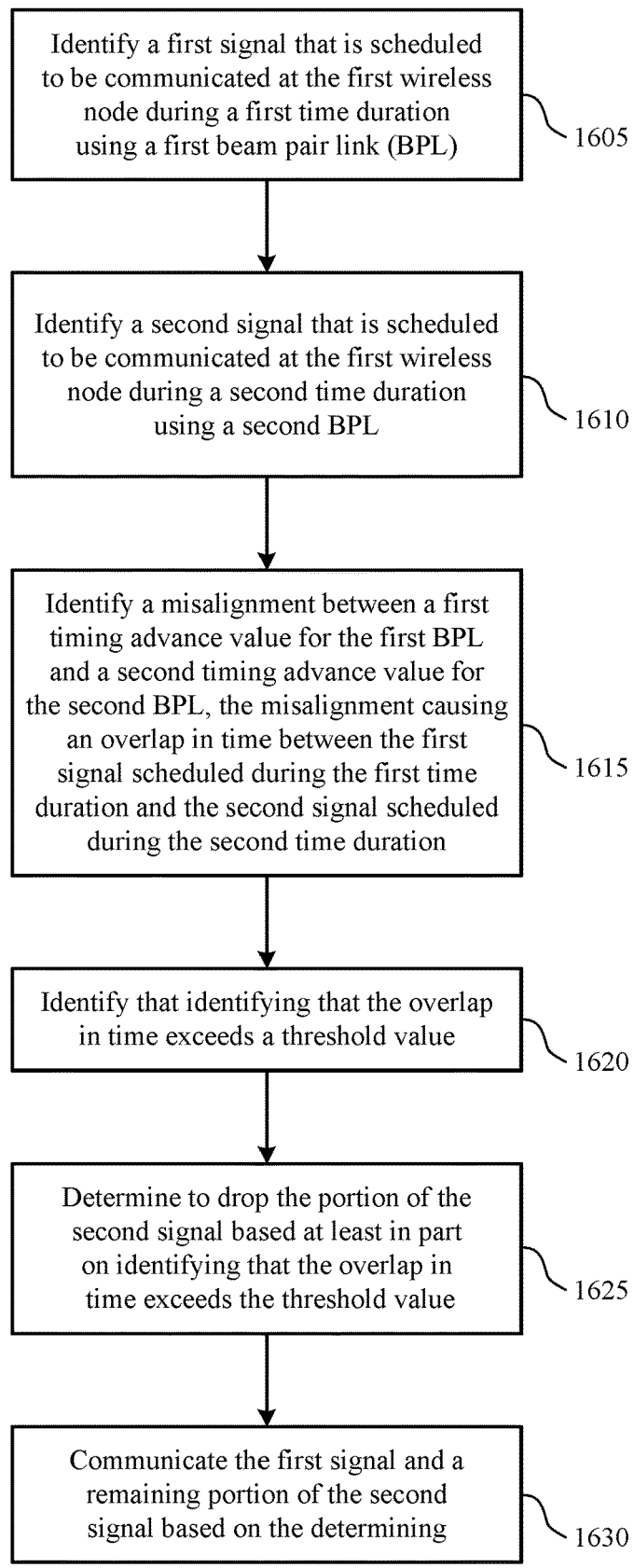

FIG. 16 shows a flowchart illustrating a method 1600 for handling overlapped uplink transmissions in accordance with aspects of the present disclosure. The operations of method 1600 may be implemented by a UE 115 or its components as described herein. For example, the operations of method 1600 may be performed by a UE communications manager as described with reference to FIGS. 7 through 10. In some examples, a UE 115 may execute a set of codes to control the functional elements of the device to perform the functions described below. Additionally or alternatively, UE 115 may perform aspects of the functions described below using special-purpose hardware.

At 1605, UE 115 may identify a first signal that is scheduled to be communicated at the first wireless node during a first time duration using a first BPL. The operations of 1605 may be performed according to the methods described herein. In certain examples, aspects of the operations of 1605 may be performed by a signal identifier component as described with reference to FIGS. 7 through 10.

At 1610, UE 115 may identify a second signal that is scheduled to be communicated at the first wireless node during a second time duration using a second BPL, the second time duration adjacent to the first time duration. The operations of 1610 may be performed according to the methods described herein. In certain examples, aspects of the operations of 1610 may be performed by a signal identifier component as described with reference to FIGS. 7 through 10.

At 1615, UE 115 may identify a misalignment between a first timing advance value for the first BPL and a second timing advance value for the second BPL, the misalignment causing an overlap in time between the first signal scheduled during the first time duration and the second signal scheduled during the second time duration. The operations of 1615 may be performed according to the methods described herein. In certain examples, aspects of the operations of 1615 may be performed by a misalignment identifier as described with reference to FIGS. 7 through 10.

At 1620, UE 115 may identify that the overlap in time exceeds a threshold value. The operations of 1620 may be performed according to the methods described herein. In certain examples, aspects of the operations of 1620 may be performed by a dropping component as described with reference to FIGS. 7 through 10.

At 1625, UE 115 may determine to drop the portion of the second signal based at least in part on identifying that the overlap in time exceeds the threshold value. The operations of 1625 may be performed according to the methods described herein. In certain examples, aspects of the operations of 1625 may be performed by a dropping component as described with reference to FIGS. 7 through 10.

At 1630, UE 115 may transmit the first signal and a remaining portion of the second signal based at least in part on the determining. The operations of 1630 may be performed according to the methods described herein. In certain examples, aspects of the operations of 1630 may be performed by a dropping component as described with reference to FIGS. 7 through 10.

In some cases, the first wireless node determines to drop the portion of the second signal scheduled during the identified overlap in time. In some examples, a first wireless node and a second wireless node, may be the same wireless node.

Figure 17:
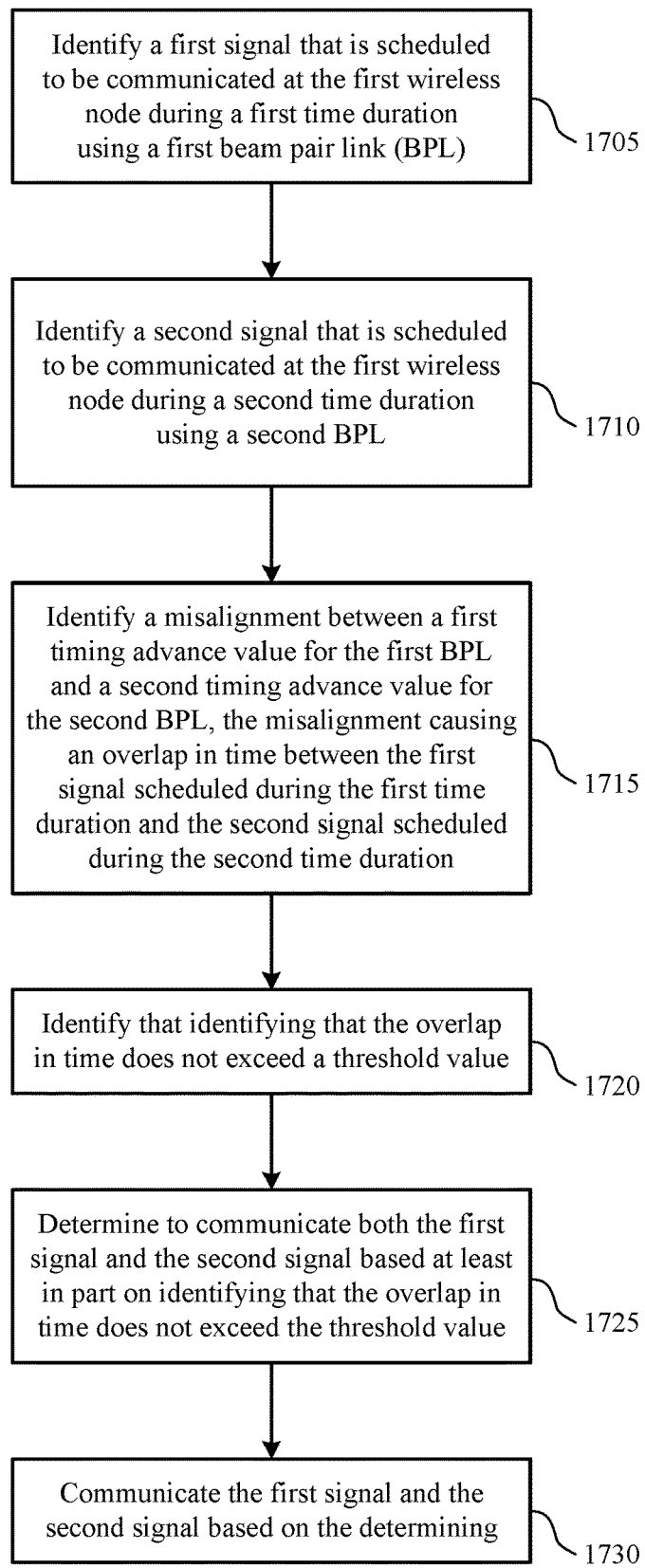

FIG. 17 shows a flowchart illustrating a method 1700 for handling overlapped uplink transmissions in accordance with aspects of the present disclosure. The operations of method 1700 may be implemented by a UE 115 or its components as described herein. For example, the operations of method 1700 may be performed by a UE communications manager as described with reference to FIGS. 7 through 10. In some examples, a UE 115 may execute a set of codes to control the functional elements of the device to perform the functions described below. Additionally or alternatively, UE 115 may perform aspects of the functions described below using special-purpose hardware.

At 1705, UE 115 may identify a first signal that is scheduled to be communicated at the first wireless node during a first time duration using a first BPL. The operations of 1605 may be performed according to the methods described herein. In certain examples, aspects of the operations of 1705 may be performed by a signal identifier component as described with reference to FIGS. 7 through 10.

At 1710, UE 115 may identify a second signal that is scheduled to be communicated at the first wireless node during a second time duration using a second BPL. The operations of 1710 may be performed according to the methods described herein. In certain examples, aspects of the operations of 1710 may be performed by a signal identifier component as described with reference to FIGS. 7 through 10.

At 1715, UE 115 may identify a misalignment between a first timing advance value for the first BPL and a second timing advance value for the second BPL, the misalignment causing an overlap in time between the first signal scheduled during the first time duration and the second signal scheduled during the second time duration. The operations of 1715 may be performed according to the methods described herein. In certain examples, aspects of the operations of 1715 may be performed by a misalignment identifier as described with reference to FIGS. 7 through 10.

At 1720, UE 115 may identify that the overlap in time does not exceed a threshold value. The operations of 1720 may be performed according to the methods described herein. In certain examples, aspects of the operations of 1720 may be performed by a dropping component as described with reference to FIGS. 7 through 10.

At 1725, UE 115 may determine to communicate both the first signal and the second signal based at least in part on identifying that the overlap in time does not exceed the threshold value. The operations of 1725 may be performed according to the methods described herein. In certain examples, aspects of the operations of 1725 may be performed by a dropping component as described with reference to FIGS. 7 through 10.

At 1730, UE 115 may communicate the first signal and the second signal based at least in part on the determining. The operations of 1730 may be performed according to the methods described herein. In certain examples, aspects of the operations of 1730 may be performed by a dropping component as described with reference to FIGS. 7 through 10.

In some cases, the first wireless node determines to drop the portion of the second signal scheduled during the identified overlap in time.

Figure 18:
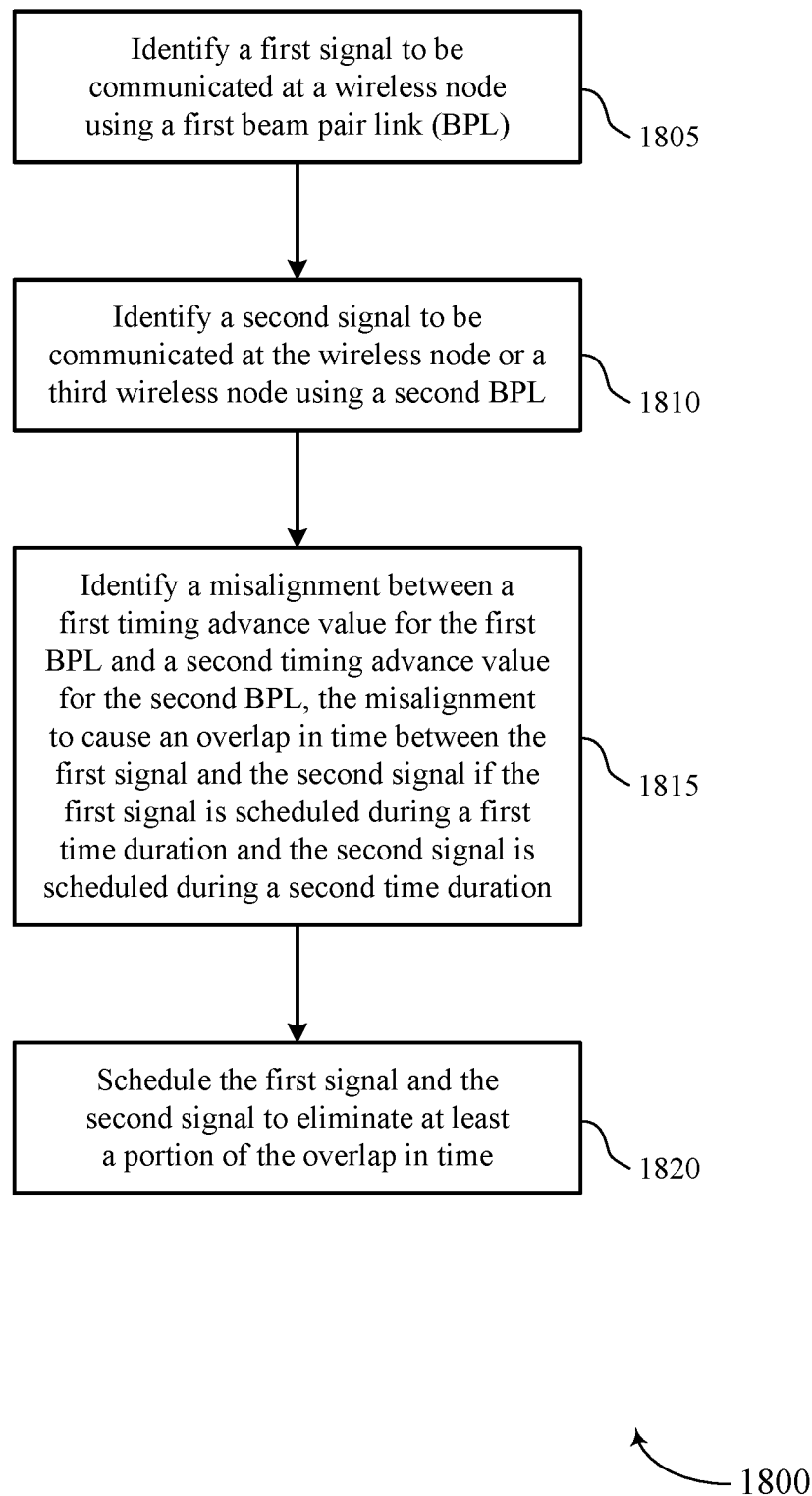

FIG. 18 shows a flowchart illustrating a method 1800 for handling overlapped uplink transmissions in accordance with aspects of the present disclosure. The operations of method 1800 may be implemented by a base station 105 or its components as described herein. For example, the operations of method 1800 may be performed by a base station communications manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At 1805, base station 105 may identify a first signal to be communicated at a wireless node using a first BPL. The operations of 1805 may be performed according to the methods described herein. In certain examples, aspects of the operations of 1805 may be performed by a signal identifier component as described with reference to FIGS. 11 through 14.

At 1810, base station 105 may identify a second signal to be communicated at the wireless node using a second BPL. The operations of 1810 may be performed according to the methods described herein. In certain examples, aspects of the operations of 1810 may be performed by a signal identifier component as described with reference to FIGS. 11 through 14.

At 1815, base station 105 may identify a misalignment between a first timing advance value for the first BPL and a second timing advance value for the second BPL, the misalignment to cause an overlap in time between the first signal and the second signal if the first signal is scheduled during a first time duration and the second signal is scheduled during a second time duration adjacent to the first time duration. The operations of 1815 may be performed according to the methods described herein. In certain examples, aspects of the operations of 1815 may be performed by a misalignment identifier as described with reference to FIGS. 11 through 14.

At 1820, base station 105 may schedule the first signal and the second signal to eliminate at least a portion of the overlap in time. The operations of 1820 may be performed according to the methods described herein. In certain examples, aspects of the operations of 1820 may be performed by a scheduling component as described with reference to FIGS. 11 through 14.

The operations described with respect to FIG. 8 may be executed by a single wireless node, which may be an example of a base station 105 or a UE 115.

Figure 19:
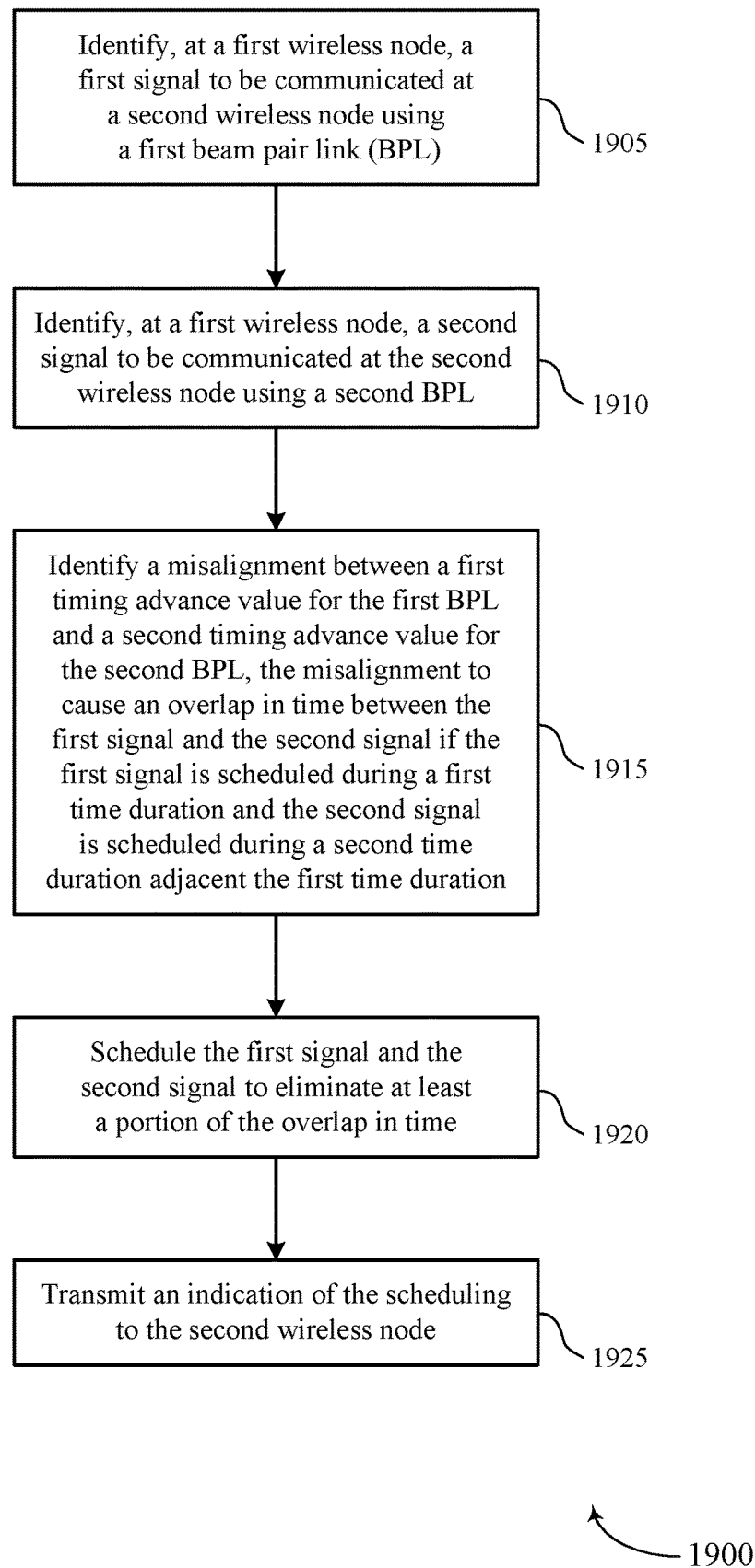

FIG. 19 shows a flowchart illustrating a method 1900 for handling overlapped uplink transmissions in accordance with aspects of the present disclosure. The operations of method 1900 may be implemented by a base station 105 or its components as described herein. For example, the operations of method 1900 may be performed by a base station communications manager as described with reference to FIGS. 11 through 14. In some examples, a base station 105 may execute a set of codes to control the functional elements of the device to perform the functions described below.

Additionally or alternatively, the base station 105 may perform aspects of the functions described below using special-purpose hardware.

At 1905, base station 105 may identify a first signal to be communicated at a second wireless node using a first BPL. The operations of 1905 may be performed according to the methods described herein. In certain examples, aspects of the operations of 1905 may be performed by a signal identifier component as described with reference to FIGS. 11 through 14.

At 1910, base station 105 may identify a second signal to be communicated at the second wireless node using a second BPL. The operations of 1910 may be performed according to the methods described herein. In certain examples, aspects of the operations of 1910 may be performed by a signal identifier component as described with reference to FIGS. 11 through 14.

At 1915, base station 105 may identify a misalignment between a first timing advance value for the first BPL and a second timing advance value for the second BPL, the misalignment to cause an overlap in time between the first signal and the second signal if the first signal is scheduled during a first time duration and the second signal is scheduled during a second time duration adjacent to the first time duration. The operations of 1915 may be performed according to the methods described herein. In certain examples, aspects of the operations of 1915 may be performed by a misalignment identifier as described with reference to FIGS. 11 through 14.

At 1920, base station 105 may schedule the first signal and the second signal to eliminate at least a portion of the overlap in time. The operations of 1920 may be performed according to the methods described herein. In certain examples, aspects of the operations of 1920 may be performed by a scheduling component as described with reference to FIGS. 11 through 14.

At 1925, base station 105 may transmit an indication of the scheduling to the second wireless node. The operations of 1925 may be performed according to the methods described herein. In certain examples, aspects of the operations of 1925 may be performed by a scheduling component as described with reference to FIGS. 11 through 14.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an (ASIC, a (FPGA or other PLD, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first wireless node, comprising:
    identifying a first signal that is scheduled to be communicated at the first wireless node during a first time duration using a first beam pair link (BPL);
    identifying a second signal that is scheduled to be communicated at the first wireless node during a second time duration using a second BPL;
    identifying a misalignment between a first timing advance value for the first BPL and a second timing advance value for the second BPL, the misalignment causing an overlap in time between the first signal scheduled during the first time duration and the second signal scheduled during the second time duration;
    determining to drop a portion of the second signal that is scheduled during the identified overlap in time; and
    communicating the first signal and a remaining portion of the second signal based at least in part on the determining.

2. The method of claim 1, wherein the first time duration and the second time duration comprise a symbol period, or a slot duration, or a non-slot duration, or a subframe duration, or a combination thereof.

3. The method of claim 1, wherein determining to drop the portion of the second signal further comprises:
    identifying that the overlap in time exceeds a threshold value; and
    determining to drop the portion of the second signal based at least in part on identifying that the overlap in time exceeds the threshold value.

4. The method of claim 1, wherein determining to drop the portion of the second signal further comprises:
    identifying that the identified overlap in time does not exceed a threshold value; and
    determining to transmit both the first signal and the second signal based at least in part on identifying that the overlap in time does not exceed the threshold value.

5. The method of claim 1, further comprising:
    identifying a first value for a communication parameter for the first signal;

identifying a second value for the communication parameter for the second signal; and comparing the first value to the second value, wherein determining whether to drop the portion of the second signal is based at least in part on the comparing.

6. The method of claim 5, wherein the communication parameter comprises a communication priority, or a type of communication, or an uplink (UL) towards a parent of the first wireless node, or a downlink (DL) towards a child of the first wireless node, or a combination thereof.

7. The method of claim 6, wherein the type of communication comprises a physical random access channel (PRACH), or a physical uplink shared channel (PUSCH), or a physical uplink control channel (PUCCH), or a sounding reference signal (SRS), or control channels, or data channels, or reference signals, or broadcast channels, or a combination thereof.

8. The method of claim 1, further comprising:
identifying a first communication configuration to be used for the first signal; and
identifying a second communication configuration to be used for the second signal, wherein determining whether to drop the portion of the second signal is based at least in part on the first communication configuration and the second communication configuration.

9. The method of claim 8, wherein each of the first communication configuration and the second communication configuration comprises a transmission power, or a beamforming configuration, or a link budget, or a combination thereof.

10. The method of claim 1, further comprising:
identifying one or more rules used to resolve communication conflicts, wherein determining whether to drop the portion of the second signal is based at least in part on the one or more rules.

11. The method of claim 10, further comprising:
receiving the one or more rules from the second node.

12. The method of claim 10, further comprising:
receiving the one or more rules via a master information block (MIB), or a system information block (SIB), or a remaining minimum system information (RMSI), or an other system information (OSI), or a radio resource control (RRC) message, or a downlink control information (DCI), or a media access control (MAC) control element (CE), or other upper layer signaling, or a combination thereof.

13. The method of claim 1, wherein the first wireless node is one of a first user equipment (UE) or a first base station and a second wireless node communicating the first signal is one of a second UE, a scheduling UE, a second base station, or a scheduling base station.

14. The method of claim 1, further comprising:
identifying that the first timing advance value for the first BPL is greater than the second timing advance value; and
communicating the first signal prior to the remaining portion of the second signal.

15. The method of claim 1, wherein communicating the first signal and the remaining portion of the second signal further comprises:
transmitting the first signal by the first wireless node; and
receiving the remaining portion of the second signal at the first wireless node.

16. A method for wireless communication at a first wireless node, comprising:

identifying a first signal to be communicated at a second wireless node using a first beam pair link (BPL);
identifying a second signal to be communicated at the second wireless node or a third wireless node using a second BPL;
identifying a misalignment between a first timing advance value for the first BPL and a second timing advance value for the second BPL, the misalignment to cause an overlap in time between the first signal and the second signal if the first signal is scheduled during a first time duration and the second signal is scheduled during a second time duration;
determining to drop a portion of the second signal; and
scheduling the first signal and a remaining portion of the second signal to eliminate at least a portion of the overlap in time.

17. The method of claim 16, further comprising:
transmitting an indication of the scheduling to the second wireless node.

18. The method of claim 16, wherein the first time duration and the second time duration comprise a symbol period, or a slot duration, or a non-slot duration, or a subframe duration, or a combination thereof.

19. The method of claim 16, further comprising:
transmitting, to the second wireless node, one or more rules used to resolve communication conflicts.

20. The method of claim 19, wherein transmitting the one or more rules comprises:
transmitting the one or more rules via a master information block (MIB), or a system information block (SIB), or a remaining minimum system information (RMSI), or an other system information (OSI), or a radio resource control (RRC) message, or a downlink control information (DCI), or a media access control (MAC) control element (CE), or other upper layer signaling, or a combination thereof.

21. The method of claim 16, wherein the first wireless node is one of a base station or a user equipment (UE), the second wireless node is one of a base station or a UE, and the third wireless node is one of a base station or a UE.

22. The method of claim 16, wherein the first wireless node and the second wireless node are the same wireless node.

23. An apparatus for wireless communication, at a first wireless node comprising:
a processor;
memory in electronic communication with the processor; and
instructions stored in the memory and executable by the processor to cause the apparatus to:
identify a first signal that is scheduled to be communicated at the first wireless node during a first time duration using a first beam pair link (BPL);
identify a second signal that is scheduled to be communicated at the first wireless node during a second time duration using a second BPL;
identify a misalignment between a first timing advance value for the first BPL and a second timing advance value for the second BPL, the misalignment causing an overlap in time between the first signal scheduled during the first time duration and the second signal scheduled during the second time duration;
determine to drop a portion of the second signal that is scheduled during the identified overlap in time; and
communicate the first signal and a remaining portion of the second signal based at least in part on the determining.

24. The apparatus of claim 23, wherein the instructions to determine to drop the portion of the second signal are executable by the processor to cause the apparatus to:
  determining to drop the portion of the second signal scheduled during the identified overlap in time.

25. The apparatus of claim 23, wherein the instructions to determine to drop the portion of the second signal are executable by the processor to cause the apparatus to:
  identify that the overlap in time exceeds a threshold value; and
  determine to drop the portion of the second signal based at least in part on identifying that the overlap in time exceeds the threshold value.

26. The apparatus of claim 23, wherein the instructions are further executable by the processor to cause the apparatus to:
  identify a first value for a communication parameter for the first signal;
  identify a second value for the communication parameter for the second signal; and
  compare the first value to the second value, wherein determining whether to drop the portion of the second signal is based at least in part on the comparison.

27. An apparatus for wireless communication at a first wireless node, comprising:
  a processor;
  memory in electronic communication with the processor; and
  instructions stored in the memory and executable by the processor to cause the apparatus to:
    identify a first signal to be communicated at a second wireless node using a first beam pair link (BPL);
    identify a second signal to be communicated at the second wireless node or a third wireless node using a second BPL;
    identify a misalignment between a first timing advance value for the first BPL and a second timing advance value for the second BPL, the misalignment to cause an overlap in time between the first signal and the second signal if the first signal is scheduled during a first time duration and the second signal is scheduled during a second time duration adjacent to the first time duration;
    determine to drop a portion of the second signal; and
    scheduling the first signal and a remaining portion of the second signal to eliminate at least a portion of the overlap in time.

28. The apparatus of claim 27, wherein the instructions are further executable by the processor to cause the apparatus to:
  transmit an indication of the scheduling to the second wireless node.

29. The apparatus of claim 27, wherein the instructions are further executable by the processor to cause the apparatus to:
  transmit, to the second wireless node, one or more rules used to resolve communication conflicts.

* * * * *